(12) United States Patent
Johnston et al.

(10) Patent No.: US 9,230,127 B2
(45) Date of Patent: *Jan. 5, 2016

(54) METHODS AND SYSTEMS FOR INCREASING THE SECURITY OF ELECTRONIC MESSAGES

(71) Applicant: Daon Holdings Limited, George Town (KY)

(72) Inventors: Neil Stephen Denis Johnston, Roundhill, VA (US); Conor Robert White, Fairfax, VA (US); Jason Scott Cramer, Vienna, VA (US); Christopher James Mort, Burke, VA (US); Christopher Eric Holland, Fairfax, VA (US)

(73) Assignee: DAON HOLDINGS LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,388

(22) Filed: Jan. 9, 2014

(65) Prior Publication Data

US 2014/0130186 A1    May 8, 2014

Related U.S. Application Data

(63) Continuation of application No. 13/363,060, filed on Jan. 31, 2012, now Pat. No. 8,661,558, which is a continuation-in-part of application No. 13/237,002, filed on Sep. 20, 2011, now Pat. No. 8,769,286.

(51) Int. Cl.
  *G06F 7/04* (2006.01)
  *G06F 21/62* (2013.01)
  *H04L 12/58* (2006.01)

(52) U.S. Cl.
  CPC ............... *G06F 21/62* (2013.01); *H04L 51/14* (2013.01); *H04L 51/34* (2013.01)

(58) Field of Classification Search
  CPC ......... G06F 21/62; H04L 63/08; H04L 12/58; H04L 51/14; H04L 51/34; H04L 51/36; G06Q 10/107; G06Q 10/10
  USPC ............ 713/166, 168; 726/4, 26, 28; 709/225
  See application file for complete search history.

(56) References Cited

U.S. PATENT DOCUMENTS 7,475,252 B2 *  1/2009  Jeffries et al. ................. 713/184
7,523,309 B1 *  4/2009  Talbot et al. ................... 713/166

(Continued)

FOREIGN PATENT DOCUMENTS

WO    WO 2004/054189 A1    6/2004
WO    WO 2004054189 A1 *  6/2004
WO    WO 2011/028261 A2    3/2011

OTHER PUBLICATIONS

Extended European Search Report for EPO Application No. 12182468.4 dated Nov. 21, 2012, pp. 1-6.

(Continued)

*Primary Examiner* — Samson Lemma
(74) *Attorney, Agent, or Firm* — Kevin McDermott, Esq.

(57) ABSTRACT

A method for accessing e-mail messages from a control system includes requesting access to e-mail message contents of a user stored in the control system, determining whether the user is enrolled in and activated by the control system, and authenticating the user when the user is enrolled in and activated by the control system. Moreover, the method includes permitting the user to view a list of e-mail messages when the user is successfully authenticated. The e-mail messages included in the list are associated with the user. Furthermore, the method includes permitting the user to access the contents of e-mail messages in the list having a security level equal to or less than a security level associated with the successful authentication.

10 Claims, 14 Drawing Sheets

(56) References Cited

U.S. PATENT DOCUMENTS

| | | | |
|---|---|---|---|
| 7,624,146 B1* | 11/2009 | Brogne et al. | 709/206 |
| 7,945,520 B2 | 5/2011 | Pizano et al. | |
| 8,112,482 B1 | 2/2012 | Geddes | |
| 8,286,227 B1* | 10/2012 | Zheng | 726/6 |
| 8,327,157 B2 | 12/2012 | West | |
| 8,676,155 B2* | 3/2014 | Fan et al. | 455/406 |
| 2001/0037315 A1 | 11/2001 | Saliba et al. | |
| 2002/0129275 A1* | 9/2002 | Decuir | 713/201 |
| 2002/0178229 A1 | 11/2002 | Sinha et al. | |
| 2005/0020286 A1 | 1/2005 | Lazaridis et al. | |
| 2006/0005020 A1 | 1/2006 | Hardt | |
| 2007/0005717 A1* | 1/2007 | LeVasseur et al. | 709/206 |
| 2007/0255790 A1 | 11/2007 | Weksler et al. | |
| 2009/0109482 A1* | 4/2009 | Sato | 358/1.15 |

OTHER PUBLICATIONS

Extended European Search Report for EPO Application No. 13153036.2 dated Jul. 10, 2013, pp. 1-6.

* cited by examiner

| Transaction Identifier | E-Mail Message Identifers | Recipient Identifiers |
|---|---|---|
| ZE864LG75W | EM1 | Conor@hotmail.com |
| WW951S5WV5 | EM1 | Jason@gmail.com |
| 02VX6YFNMA | EM1 | Holland@gmail.com |
| 95KM9R8UZ5 | EM2 | James@gmail.com |
| CU9VP6RQ27 | EM2 | Ernie@aol.com |
| NA861VTN2K | EM3 | John@aol.com |
| ZT7L68RMMX | EM3 | Holland@gmail.com |
| 6S82L96U1V | EM3 | Conor@hotmail.com |
| 0Z8P8A3Y6Q | EM4 | Scooter@yahoo.com |

METHODS AND SYSTEMS FOR INCREASING THE SECURITY OF ELECTRONIC MESSAGES

CROSS-REFERENCE TO RELATED APPLICATIONS

This is a continuation application of U.S. patent application Ser. No. 13/363,060, filed Jan. 31, 2012, which is a continuation-in-part application of U.S. patent application Ser. No. 13/237,002, filed Sep. 20, 2011, the disclosures of which are incorporated herein by reference.

BACKGROUND OF THE INVENTION

This invention relates generally to methods and systems for increasing the security of electronic messages, and more particularly, to methods and systems for increasing the security of electronic mail messages transmitted over networks against fraudulent access by imposters and for increasing sender control over electronic mail messages after transmission.

Electronic mail (e-mail) accounts are generally associated with a user, and e-mail messages within the account contain information typically intended for the user only to see. In an effort to ensure that users only are able to access their e-mail accounts, and thus e-mail messages within the accounts, users are generally required to enter a username and password to access their accounts. However, imposters have been known to surreptitiously obtain such usernames and passwords for use in fraudulently accessing email accounts. Thus, imposters have been known to view e-mail messages within an account intended only for the user and to send fraudulent e-mail messages from the account.

It has been known to use identification systems in conjunction with e-mail systems in an effort to prevent imposters from fraudulently accessing e-mail accounts and thereby increase the security of e-mail messages. Such identification systems typically send encrypted e-mail messages that are to be decrypted upon receipt in order to access. Some such identification systems require the user to enter a secret personal identification number (PIN) prior to decrypting received e-mail messages. However, imposters have also been known to surreptitiously obtain PINS that are supposed to be secret and known only to users. As another effort to increase the security of e-mail messages, e-mail message senders have been known to manage e-mail messages such that recipients cannot forward or copy the messages. However, such efforts have not been known to meaningfully increase e-mail message security to a level that effectively prevents imposters from fraudulently accessing e-mail messages.

Consequently, e-mail message senders have not been known to exercise meaningful control over the security of e-mail messages after transmission. For example, e-mail senders are generally unable to control who may access messages after transmission and ensure that adequate authentication occurs prior to accessing e-mail messages after transmission. Moreover, senders are generally unable to control inadvertent e-mail distribution by e-mail message recipients.

BRIEF DESCRIPTION OF THE INVENTION

In one aspect, a method for accessing e-mail messages from a control system is provided. The method includes requesting access to e-mail message contents of a user stored in the control system, determining whether the user is enrolled in and activated by the control system, and authenticating the user when the user is enrolled in and activated by the control system. Moreover, the method includes permitting the user to view a list of e-mail messages when the user is successfully authenticated. The e-mail messages included in the list are associated with the user. Furthermore, the method includes permitting the user to access the contents of e-mail messages in the list having a security level equal to or less than a security level associated with the successful authentication.

In another aspect, a computer system for increasing the security of e-mail messages is provided. The computer system includes at least one communications device configured to capture authentication data, create and transmit e-mail messages, and communicate with other devices. The computer system also includes an authentication system including an authentication database that is configured to communicate with the at least one communications device, to authenticate users sending and receiving e-mail messages, and to store enrollment data records of users. Moreover, the computer system includes a control system configured to generate and store identifiers, store and change control attributes of e-mail messages, store e-mail message contents, validate e-mail message contents, and communicate with the authentication system and the at least one communications device. Furthermore, the control system is configured to determine whether a user is enrolled therein and activated, and to permit the user to view a list of e-mail messages when the user is successfully authenticated by the authentication system. The e-mail messages are associated with the user. Additionally, the control system is configured to permit the user to access the contents of e-mail messages in the list having a security level equal to or less than a security level associated with the successful authentication.

In yet another aspect, a computer program recorded on a non-transitory computer-readable recording medium, included in an electronic mail security computer system for enabling increased security of e-mail messages, is provided. The computer program includes instructions which, when read and executed by the electronic mail security computer system, cause the electronic mail security computer system to determine whether a user is enrolled in and activated by the electronic mail security computer system in response to a request for accessing the e-mail message contents of the user. Moreover, the computer program causes the electronic mail security computer system to authenticate the user when the user is enrolled in and activated by the electronic mail security computer system, and permit the user to view a list of e-mail messages when the user is successfully authenticated. The e-mail messages included in the list are associated with the user. Furthermore, the computer program causes the electronic mail security computer system to permit the user to access the contents of e-mail messages in the list having a security level equal to or less than a security level associated with the successful authentication.

DETAILED DESCRIPTION OF THE INVENTION

Figure 1:
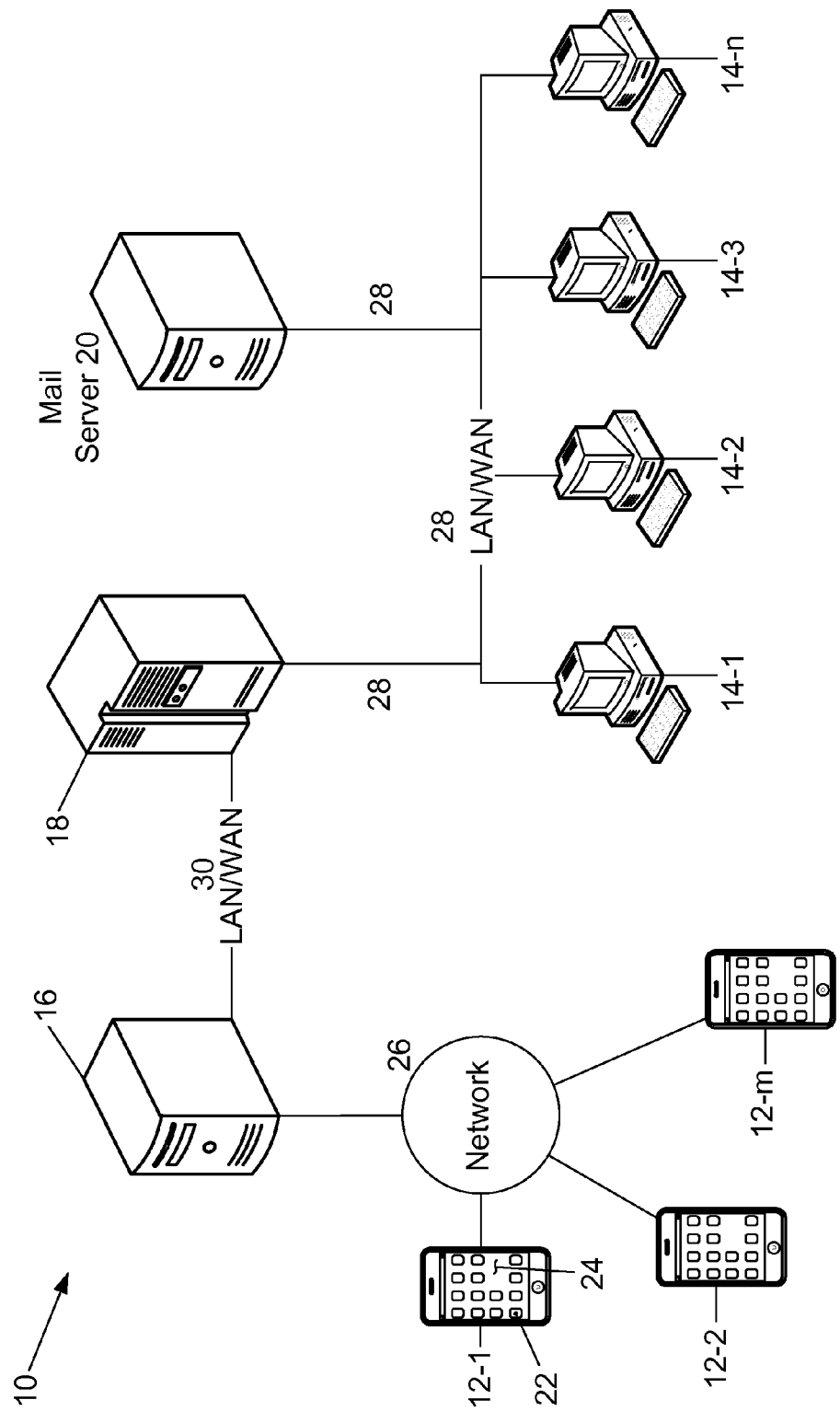
FIG. 1 is a block diagram of an exemplary embodiment of an e-mail security computer system for increasing the security of electronic messages against access by imposters.

FIG. 1 is an expanded block diagram of an exemplary embodiment of an Electronic Mail (e-mail) Security Computer (EMSC) System 10 for increasing the security of e-mail messages against fraudulent access by imposters. More specifically, the EMSC system 10 includes communications devices 12-1 to 12-$m$, computing devices 14-1 to 14-$n$, a Biometric Authentication Computer (BAC) System 16, a Control Computer (CC) system 18, and an e-Mail Server 20. Each of the communications devices 12-1 to 12-$m$ is associated with a user. Each user may operate any one of the computing devices 14-1 to 14-$n$.

Each of the communications devices 12-1 to 12-$m$ is a smart phone that stores applications therein, stores data therein, displays at least one of text and images, and captures authentication data. Each communications device 12-1 to 12-$m$ may include at least one of buttons and icons 22 for at least entering commands and invoking applications stored therein, and a display screen 24 such as, but not limited to, a Liquid Crystal Display (LCD), that displays at least one of text and images. Moreover, each communications device 12-1 to 12-$m$ may include at least one camera (not shown) and at least a microphone (not shown). The applications may cause the communications devices to perform functions such as, but not limited to, generating, transmitting, receiving and displaying e-mail messages, and capturing authentication data from users.

Although the communications devices 12-1 to 12-$m$ are smart phones in the exemplary EMSC system 10, the communications devices may alternatively be any device capable of at least storing data, displaying at least one of text and images, and capturing and transmitting data. Such other devices include, but are not limited to, a portable cellular phone, a tablet computer, a laptop computer, any type of portable communications device having wireless capabilities such as a personal digital assistant (PDA), and a personal computer.

The communications devices 12-1 to 12-$m$ are configured to communicate with the BAC system 16 over a communications network 26. The communications network 26 is a 3G communications network. Alternatively, the communications network 26 may be any wireless network including, but not limited to, 4G, Wi-Fi, Global System for Mobile (GSM), Enhanced Data for GSM Evolution (EDGE), and any combination of a local area network (LAN), a wide area network (WAN) and the Internet. Moreover, the communications devices 12-1 to 12-$m$ are configured to at least wirelessly access the Internet over the network 26. The network 26 may also be any type of wired network.

Each of the computing devices 14-1 to 14-$n$ is a personal computer that may include devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, each of the computing devices 14-1 to 14-$n$ may include a display device, such as, but not limited to, a liquid crystal display (LCD), a cathode ray tube (CRT) and other display monitors. Furthermore, each of the computing devices 14-1 to 14-$n$ may include a printer and input devices such as, but not limited to, a mouse (not shown), keypad (not shown), a keyboard, a camera (not shown), a microphone (not shown), and any type of biometric capture device (not shown). Each of the computing devices 14-1 to 14-$n$ stores applications therein, may capture biometric data, and is configured to communicate with the CC system 18, the E-mail Server 20, and other computing devices 14-$n$ over a network 28 such as, but not limited to, a LAN, a WAN, and the Internet.

Although each of the computing devices 14-1 to 14-$n$ is a personal computer in the exemplary EMSC system 10, each of the computing devices 14-1 to 14-$n$ may alternatively be any computing device such as, but not limited to, tablet computers, laptop computers, smart phones, and any type of portable communications device having wireless capabilities such as a personal digital assistant (PDA). The designations "m" and "n" as used in conjunction with the communication device designation 12-$m$ and with the computing device designation 14-$n$, respectively, are intended to indicate that any number "m" of communications devices 12 and any number "n" of computing devices 14 may be included in the EMSC system 10.

A user may be an e-mail message sender, an e-mail message recipient, or both. A user operating his communications device 12-$m$ or one of the computing devices 14-$n$ to create and transmit an e-mail message is referred to herein as a sender. A user operating his communications device 12-$m$ or a computer device 14-$n$ that receives an e-mail message is referred to herein as a recipient.

The BAC system 16 includes components such as, but not limited to, a web server, a database server, an application server, a directory server and a disk storage unit that may be used to store any kind of data. The disk storage unit may store at least one database such as, but not limited to, an authentication database. The application server stores applications therein. The BAC system 16 also includes a database management server and an authentication server. The database management server may be used to facilitate transferring data to and from the disk storage device. The authentication server performs matching of any feature or information associated with users to authenticate the identity of users as described herein.

The BAC system 16 is configured to communicate with the communications devices 12-*m* over the network 26 and the CC system 18 over a network 30, such as, but not limited to, a LAN, WAN, or Internet. The BAC system 16 may also perform functions such as, but not limited to, authenticating e-mail message senders and recipients, storing at least authentication data of each of a plurality of authorized users in a respective enrollment data record, extracting data from messages and determining whether captured authentication data is of sufficient quality for conducting an authentication transaction. The authentication data is biometric data that corresponds to any biometric modality desired to be used as the basis of authenticating a user. Such biometric modalities include, but are not limited to, voice, face, finger, iris, palm, and electrocardiogram, and any combination of voice, face, finger, iris, palm, and electrocardiogram. The biometric data may take any form such as, but not limited to, audio recordings and photographic images.

The enrollment data record of each authorized user stored in the BAC system 16 includes data such as, but not limited to, enrollment biometric data, enrollment biometric templates, recipient identifiers, and personal data. Enrollment biometric data is raw biometric data obtained from the user during enrollment in the BAC system 16. The enrollment biometric data for each user may be processed during enrollment to generate at least one enrollment biometric template, for each respective user, which is used by the BAC system 16 to conduct authentication transactions. Personal data includes any demographic information regarding an individual including, but not limited to, an individual's name, age, date-of-birth, address, citizenship and marital status. Each enrollment data record may also include any kind of data that may be used to authenticate the identity of users.

Although the biometric data is captured from users during enrollment in the BAC system 16, the biometric data may alternatively be obtained by any other method such as, but not limited to, automatically reading or extracting the biometric data from identity documents or from legacy databases included in other computer systems. Likewise, biometric templates corresponding to the biometric data may be obtained by any method such as, but not limited to, automatically reading or extracting the biometric templates from identity documents or from legacy databases included in other computer systems. Biometric templates corresponding to desired biometric data may be obtained in addition to, or instead of, the desired biometric data. Such other legacy database systems include, but are not limited to, systems associated with motor vehicle administrations, social security administrations, welfare system administrations, financial institutions and health care providers. Such identity documents include, but are not limited to, passports and driver's licenses. By extracting desired biometric data or biometric templates from a legacy database or identity document, and storing the extracted data in the BAC system 16, users may be enrolled therein without having to directly provide biometric data.

The BAC system 16 may also store configurable authentication policies some of which may be used to determine data that is to be captured or obtained from users during enrollment in the BAC system 16, and others which may be used to determine data to be captured from users during authentication transactions.

The CC system 18 includes components such as, but not limited to, a web server, a database server, an application server, a directory server, and a disk storage unit that may be used to store any kind of data. The disk storage unit may store databases such as, but not limited to, an e-mail message database.

The CC system 18 is configured to communicate with the BAC system 16 over the network 30, and with the e-mail server 20 and computing devices 14-*n* over the network 28. Applications stored in the application server cause the CC system 18 to perform functions such as, but not limited to, generating and storing e-mail message identifiers, recipient identifiers, and transaction identifiers, as well as associating the identifiers with each other. Moreover, the applications may cause the CC system 18 to perform functions such as, but not limited to, generating functions and associating each function with a corresponding e-mail message, storing e-mail message information, changing control attributes, replacing e-mail message contents with a function, validating e-mail message contents, generating and transmitting authentication request messages, retrieving e-mail message contents, and transmitting e-mail message contents to recipients. Authentication request messages include at least information that facilitates determining an authentication data requirement. The CC system 18 may also store configurable authentication policies that facilitate associating different authentication data requirements with an e-mail message.

The e-mail server 20 is a computer that manages e-mail messages by receiving e-mail messages from devices such as, but not limited to, the computing devices 14-*n*, and transmitting e-mail messages to other devices. Moreover, the e-mail server 20 is configured to communicate with the computing devices 14-*n* over the network 28.

Each of the computing devices 14-*n*, together with the network 28, the e-mail server 20, and the CC system 18, forms a different communications channel. Consequently, each computing device 14-*n* together with the network 28, the e-mail server 20, and the CC system 18 constitutes a communications channel that is referred to herein as a first communications channel. Each of the communications devices 12-*m*, together with the communications network 26 and the BAC system 16, also forms a different communications channel. Consequently, each communications device 12-*m*, together with the communications network 26 and the BAC system 16, constitute a communications channel separate and distinct from the first communications channel. The separate and distinct communications channel is referred to herein as a second communications channel. Imposters that are able to monitor communications and steal identity information over a first communications channel typically are not aware of a second communications channel, and vice-versa, and thus are not motivated to monitor communications over the other channel.

Each user is assumed to be in possession of his communications device 12-*m* and is assumed to be contactable using his communications device 12-*m*. Thus, by virtue of transmitting a data capture request to the communications device 12-*m* of a user, the data capture request is considered to be transmitted to the user. A data capture request is a message that requests a user to capture authentication data. Authentication data may be obtained by and transmitted from a communications device that is out-of-band with a computing device 14-*n* operated by the user, that is, any communications device separate and distinct from the computing device 14-*n* operated by the user, and that communicates on a different channel than the computing device 14-n operated by the user. Each of the communication devices 12-m is such an out-of-band communications device.

The communications devices 12-m, the computing devices 14-n, the BAC system 16, the CC system 18, and the e-mail server 20, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the communications devices 12-m, the computing devices 14-n, the BAC system 16, the CC system 18, and the E-mail Server 20. The above examples are exemplary only, and are thus not intended to limit in any way the definition and/or meaning of the term "processor."

The respective memories (not shown) in the communications devices 12-m, the computing devices 14-n, the BAC system 16, the CC system 18, and the E-mail Server 20 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the communications devices 12-m, the computing devices 14-n, the BAC system 16, the CC system 18, and the e-mail server 20. Moreover, each of the respective memories (not shown) can be a computer-readable recording medium used to store computer programs or executable instructions that are executed, respectively, by the communications devices 12-m, the computing devices 14-n, the BAC system 16, the CC system 18, and the e-mail server 20. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

An authentication data requirement is a requirement for authentication data that is to be used for conducting an authentication transaction. The authentication data requirement may be a requirement for any kind of information that may be used to authenticate users such as, but not limited to, biometric data, Global Positioning System (GPS) coordinates, pass-phrases, passwords, personal identification numbers, and any combination thereof. Moreover, the authentication data requirement may be determined in any manner.

Figure 2:
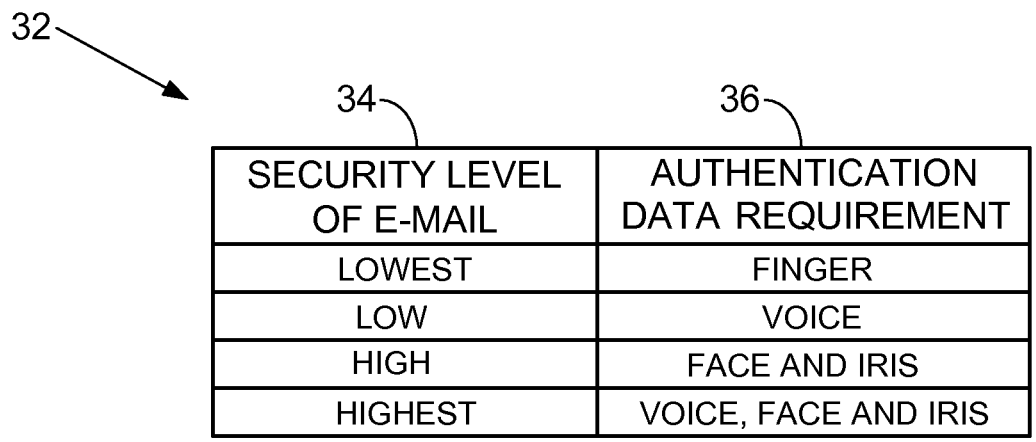
FIG. 2 is a diagram illustrating an exemplary configurable authentication policy.

FIG. 2 is a diagram illustrating an exemplary configurable authentication policy 32 that may be stored in the BAC system 18, and may be used for determining authentication data requirements 36. More specifically, the authentication policy 32 includes four different security levels 34 and an authentication data requirement 36 corresponding to each different security level 34. The security levels 34 vary from a highest level to a lowest level. Each security level 34 corresponds to the degree of security a sender may desire to associate with the contents of an e-mail message, in an effort to prevent the e-mail message contents from being fraudulently accessed by an imposter. A security level 34 may be assigned to each e-mail message by the sender. For example, an e-mail message containing information about changing time from Daylight Savings Time to Standard Time may be assigned a lowest security level 34, while an e-mail message regarding highly sensitive corporate merger plans may be assigned a highest level of security 34. Instead of assigning a security level 34 to each e-mail message, a sender may assign any information to each e-mail message that facilitates determining the authentication data requirement of the e-mail message.

As the security level 34 increases, the authentication data requirement 36 may become more demanding. For example, as the security level 34 of an e-mail message increases, the number of different biometric modalities required for authentication may also increase. Alternatively, as the security level 34 of an e-mail message increases, the higher security levels 34 may not require additional biometric modalities for authentication. Instead, the security levels 34 may require a single different biometric modality. For example, the low security level 34 may require voice biometric data, the high security level 34 may require face biometric data, and the highest security level 34 may require iris biometric data.

The authentication data requirement 36 for a security level 34 may be a combination of the authentication data requirements 36 for lower security levels 34. For example, the authentication data requirement 36 for the highest security level 34 may be a combination of the authentication data requirements 36 of the high and low security levels 34.

The authentication policy 32 may be reconfigured by defining the authentication data requirements 36 and the security levels 34 in any desirable manner. Moreover, the policy 32 may be reconfigured by changing the definitions of the authentication data requirements 36 and the security levels 34. For example, the authentication data requirement 36 for a high security level 34 may be reconfigured to be face, iris and fingerprint biometric data, instead of face and iris biometric data. The authentication policy 32 may also be stored in the communications devices 12-m, the computing devices 14-n, and the CC system 18. Although the authentication policy 32 includes four security levels 34 and associated authentication data requirements 36, the authentication policy 32 may alternatively include any number of security levels 34 and associated authentication data requirements 36.

Additional configurable authentication policies that determine the authentication data requirement 36 may also be stored in any component of the EMSC system 10. Such additional configurable authentication policies may determine the authentication data requirement 36 based on factors such as, but not limited to, whether a sender and a recipient belong to a same organization or whether the e-mail message includes attachments.

Instead of storing configurable authentication policies in the components of the EMSC system 10, one authentication data requirement 36 may be defined and used for all authentication transactions. For example, the one authentication data requirement 36 may indicate that face and voice biometric data are to be captured and used for each authentication transaction. Alternatively, the one authentication data requirement 36 may indicate that a personal identification number is to be obtained and used for each authentication transaction. The one authentication data requirement 36 may be stored in the BAC system 16 or the CC system 18.

Figure 3:
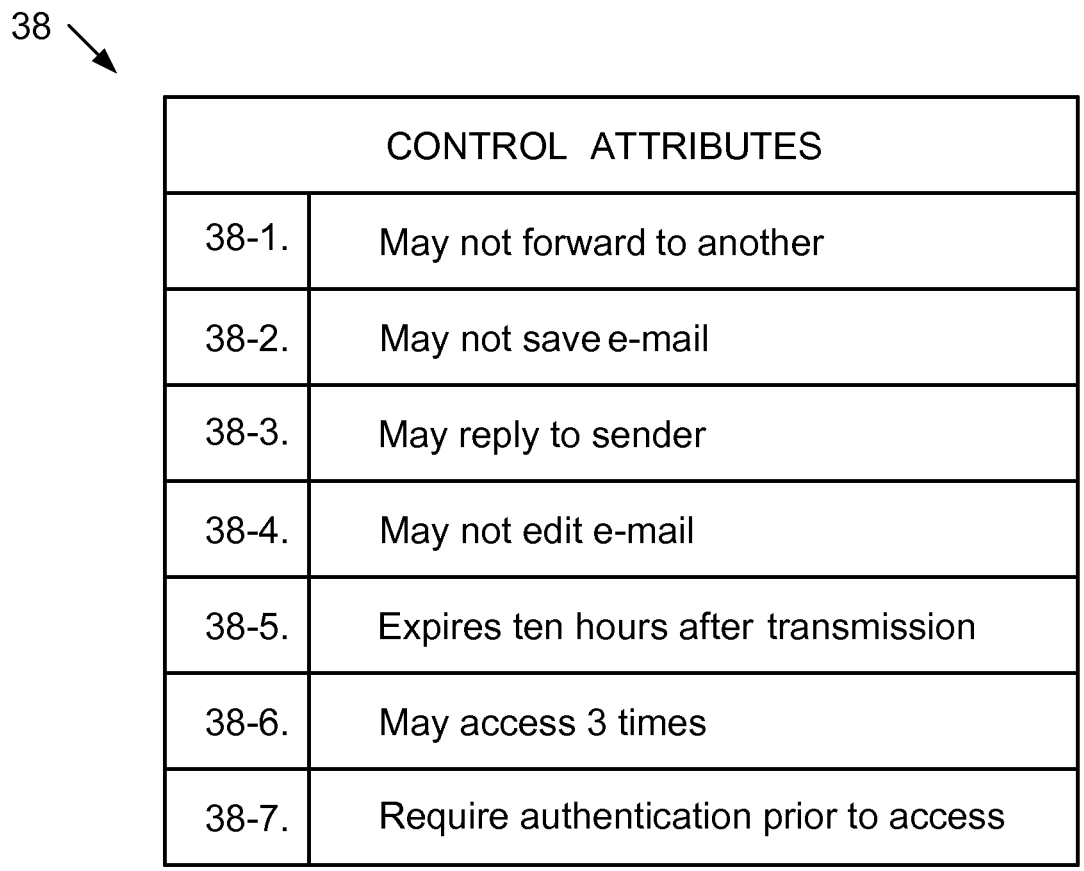
FIG. 3 is a diagram illustrating a registry of exemplary control attributes.

FIG. 3 is a diagram illustrating a registry 38 of exemplary control attributes 38-1 to 38-7 that may be assigned to an e-mail message by a sender to facilitate increasing sender control over transmitted e-mail messages, and thereby facilitate increasing the security of e-mail messages against access by imposters. More specifically, the registry 38 includes a first control attribute 38-1 that prohibits a recipient from forwarding an e-mail message to another recipient, and a second control attribute 38-2 that prohibits the recipient from saving the e-mail. The registry 38 also includes a third control attribute 38-3 that permits a recipient to reply to the sender of the e-mail message, and a fourth control attribute 38-4 that prohibits the recipient from editing the e-mail. Moreover, the registry 38 includes a fifth control attribute 38-5 that prohibits a recipient from accessing an e-mail message ten hours after transmission, and a sixth control attribute 38-6 that permits a recipient to access an e-mail message three different times. Additionally, the registry 38 includes a seventh control attribute 38-7 that requires recipients to successfully authenticate prior to accessing the e-mail contents. Any one of, or any combination of the control attributes 38-1 to 38-7, may be selected by a sender and assigned to an e-mail message such that the control attributes may be executed prior to or while a recipient accesses the e-mail message contents.

Although the registry 38 includes seven control attributes, the registry 38 may alternatively include any number of control attributes that facilitate enabling senders to increase the security of e-mail messages against access by imposters. The control attributes may be changed by the sender at any time before or after the e-mail message was sent. Consequently, for example, the sender may change the control attributes of an e-mail message by extending the expiry time of the e-mail message after it was sent, even after it has expired.

Figures 4, 5:
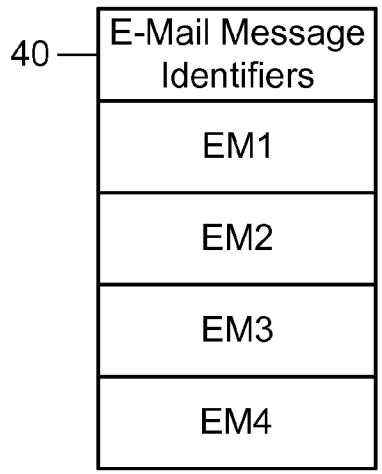
FIG. 4 is a diagram illustrating an exemplary e-mail registry.
FIG. 5 is a diagram illustrating an exemplary transaction registry used for associating transaction identifiers with e-mail message information and e-mail recipients.

FIG. 4 is a diagram illustrating an exemplary e-mail registry 40 stored in the CC system 18. More specifically, the e-mail registry 40 includes e-mail message identifiers EM1, EM2, EM3, and EM4, that are each associated with different e-mail message contents stored in the CC system 18. The e-mail message identifiers are generated by the CC system 18 such that each e-mail message identifier is different. Although four e-mail message identifiers are included in the registry 40, the e-mail registry 40 may alternatively include any number of e-mail message identifiers.

FIG. 5 is a diagram illustrating an exemplary transaction registry 42 stored in the CC system 18 that is for associating transaction identifiers with e-mail message information and e-mail message recipients. More specifically, the transaction registry 42 includes a column for transaction identifiers, e-mail message identifiers, and recipient identifiers such that each transaction identifier is associated with a corresponding e-mail message identifier and a recipient identifier. When an e-mail message has a plurality of recipients, each transaction identifier is associated with the corresponding e-mail message identifier and a different recipient identifier. By virtue of being associated with a corresponding e-mail message identifier, each transaction identifier is associated with the information of the e-mail message identified by the e-mail message identifier.

The transaction registry 42 may be used to map a transaction identifier, extracted from a function received and processed by the CC system 18, to an e-mail message identifier and a recipient identifier. For example, when the extracted transaction identifier is WW951S5WV5, the extracted transaction identifier is compared against those in the transaction registry 42. As a result, it is determined that the extracted transaction identifier is included in the transaction registry 42 and maps to e-mail message EM1 and to recipient identifier Jason@gmail.com. The e-mail recipient is the user associated with the e-mail address Jason@gmail.com.

Each recipient identifier is the e-mail address of a corresponding e-mail recipient. However, the recipient identifiers may alternatively be alphanumeric, numeric, or alphabetic text strings of any length. The e-mail message identifiers and the transaction identifiers may also be alphanumeric, numeric, or alphabetic text strings of any length.

Figure 6:
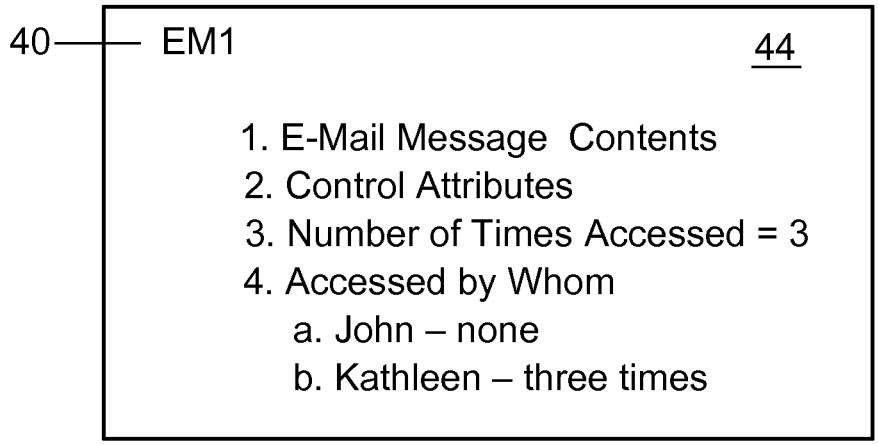
FIG. 6 is an exemplary screen display illustrating information that may be associated with an e-mail message.

FIG. 6 is an exemplary screen display 44 illustrating information that may be associated with an e-mail message and viewed by the sender after transmission. More specifically, the screen display 44 includes the e-mail identifier 40 corresponding to an e-mail message selected by the sender for viewing as well as e-mail message information. The e-mail message information includes, but is not limited to, the e-mail message contents, control attributes assigned to the e-mail message by the sender, and the number of times the e-mail message has been accessed and by whom. The e-mail message contents include, but are not limited to, any drafted messages included in the e-mail message and attachments associated with the e-mail message. The e-mail message information may be different than that described herein and may include, but is not limited to, the security level 34 and the recipients of the e-mail message.

Figure 7:
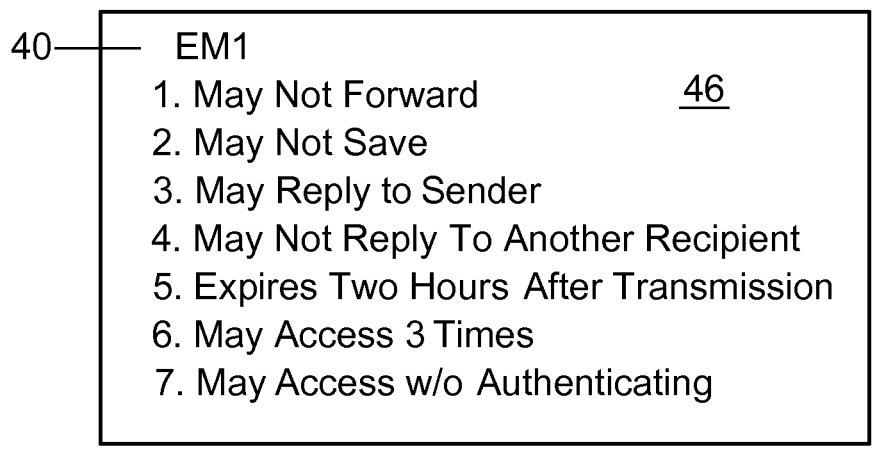
FIG. 7 is an exemplary control attribute display screen.

FIG. 7 is an exemplary control attribute display screen 46 illustrating control attributes assigned to the selected e-mail message. More specifically, the control attributes include prohibiting recipients from forwarding the e-mail message to others, prohibiting recipients from saving the e-mail message to a storage device, permitting recipients to reply to the sender, prohibiting recipients from replying to each other, requiring the e-mail message to expire two hours after transmission, permitting recipients to access the e-mail message up to three times, and permitting users to access the e-mail without being successfully authenticated.

The control attributes may be changed by the sender after transmitting the e-mail message. Consequently, upon viewing the display screen 44, should the sender decide to change at least one control attribute, the sender navigates to the control attribute display screen 46 by, for example, clicking on the "Control Attributes" text. Next, the sender is presented with the control attribute display screen 46 illustrating the control attributes assigned to the e-mail message. For example, upon viewing the display screen 44 one hour and forty-five minutes after transmitting an e-mail message, the sender may notice that John has only fifteen minutes to access the e-mail message before it expires. Because the sender believes it is important for John to access and view the e-mail message, the sender may decide to change the expiration time so John has more time to review the e-mail message. After clicking on the "Control Attribute" text of the display screen 44, the sender is presented with the control attribute display screen 46. The sender changes the expiration time to ten hours after transmission. While changing the expiration time, the sender notices that he accidentally permitted recipients to access the e-mail without successfully authenticating. Consequently, the sender also changes the control attributes to indicate that recipients are required to successfully authenticate prior to accessing the e-mail.

Figure 8:
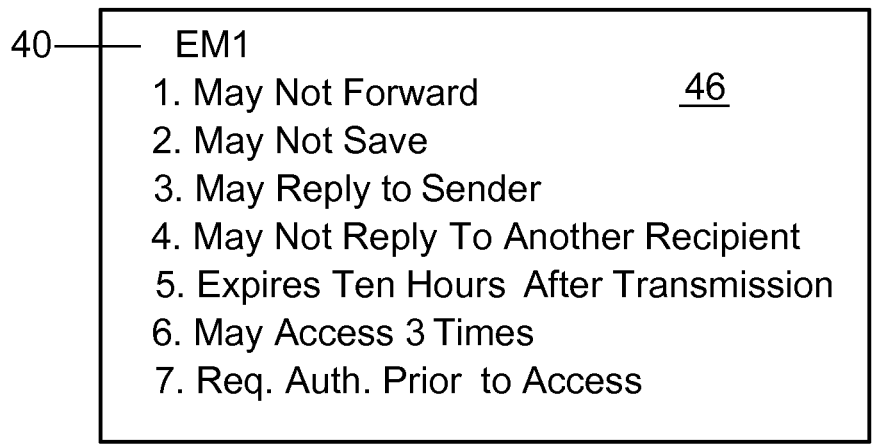
FIG. 8 is the control attribute display screen as shown in FIG. 7 including changes to the control attributes.

The information shown in FIG. 8 is the same information shown in FIG. 7 as described in more detail below. As such, features illustrated in FIG. 8 that are identical to features illustrated in FIG. 7 are identified using the same reference numerals used in FIG. 7.

FIG. 8 is the exemplary control attribute display screen 46 illustrating control attributes assigned to the selected e-mail message after the attribute changes are made by the sender. More specifically, the control attribute display screen 46 has been changed to include a control attribute that causes the e-mail message to expire ten hours after transmission and a control attribute that requires recipients to successfully authenticate prior to accessing the e-mail message. The e-mail message information, including the changed control attributes, is stored in the CC system 18.

The e-mail message contents may also be changed by the sender after transmitting the e-mail message in a manner similar to that described above for changing the control attributes. However, instead of clicking "Control Attributes" on the display screen 44, a user clicks "E-Mail Message Contents" to access and change the drafted message and attachments.

Figure 9:
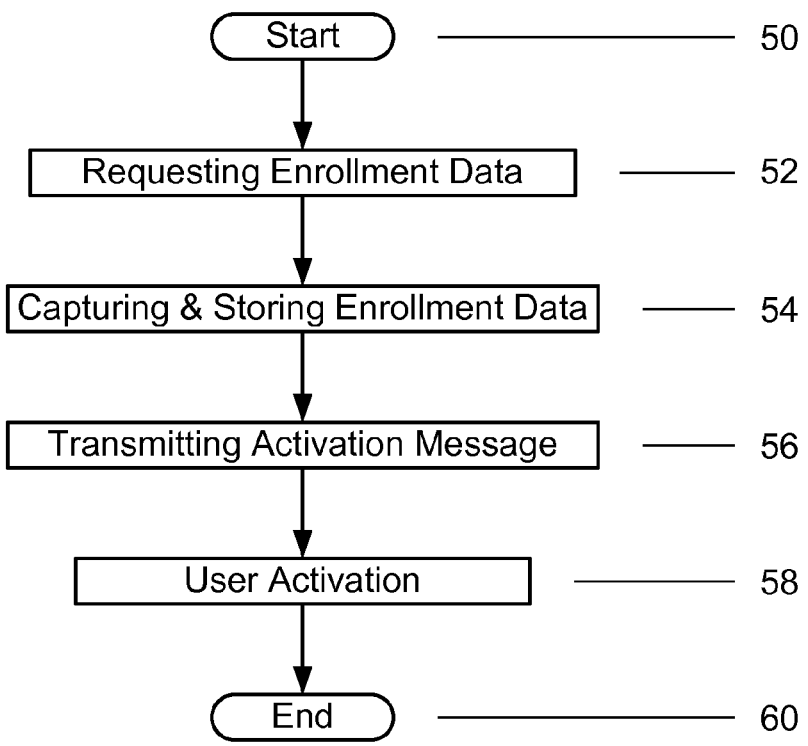
FIG. 9 is a flowchart illustrating an exemplary enrollment process for enrolling users in computer systems.

FIG. 9 is a flowchart 48 illustrating an exemplary enrollment process used by the EMSC system 10 for enrolling users in the BAC system 16 and the CC system 18. For the EMSC system 10, the process starts 50 when a user, desiring to enroll, causes his communications device 12-1 to display a message requesting the user to obtain enrollment data 52. The user may be requested to capture biometric data such as, but not limited to, voice and face biometric data, and to provide his name and e-mail address. After reading the message, the user continues by capturing enrollment data 54 with communications device 12-1 in accordance with the request. Next, the communications device 12-1 continues by transmitting the captured enrollment data to the BAC system 16 which processes the captured biometric data into an enrollment biometric template. The BAC system 16 continues processing by storing 54 the enrollment biometric template with the other captured enrollment data in an enrollment data record created for the enrolling user.

The BAC system 16 continues by transmitting the captured enrollment data, less the captured biometric data, to the CC system 18. In response, the CC system 18 continues processing by transmitting an activation message 56 to the e-mail address included in the captured enrollment data and transmitting a message to the device 12-1. The communications device 12-1 continues processing by displaying a message prompting the enrolling user to access the transmitted activation e-mail and to click on a hyperlink embedded in the activation e-mail. Clicking on the embedded hyperlink activates the hyperlink. Next, the user clicks on 58 the embedded hyperlink. In response, the CC system 18 determines that the user is properly enrolled and that the enrollment of the user has been activated 58. By virtue of being properly enrolled in and activated by the CC system 18, the user may send and receive secure e-mail messages using the EMSC system 10. Next, processing ends 60. Instead of using a communications device 12-m, users may alternatively conduct the exemplary enrollment process by operating a computing device 14-n.

Although enrollments are activated by the CC system 18 as a result of clicking on an embedded hyperlink included in an activation message in the exemplary enrollment process, in alternative enrollment processes enrollment activation may occur in any manner.

Figure 10:
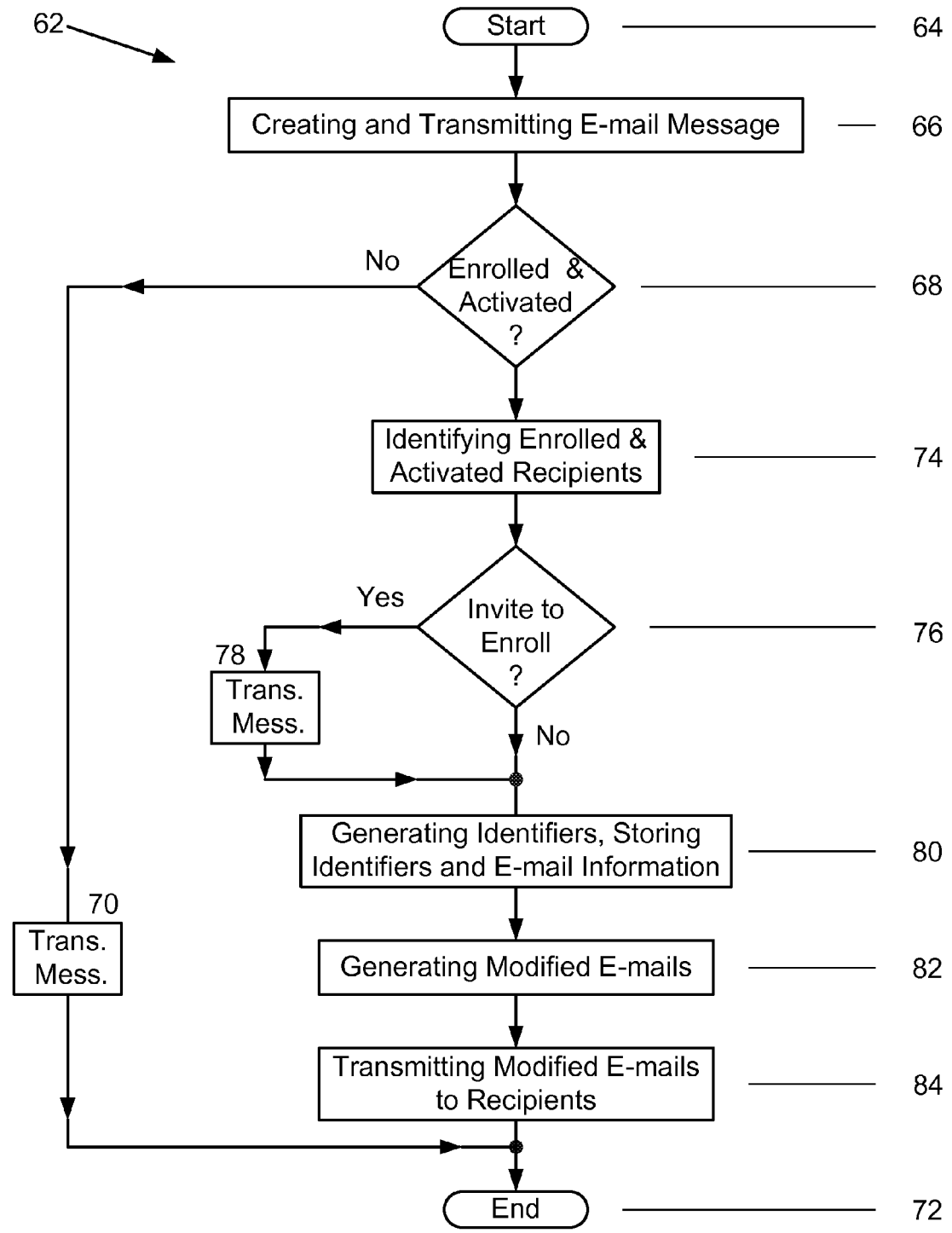
FIG. 10 is a flowchart illustrating an exemplary process for generating e-mail messages with increased security.

FIG. 10 is a flowchart 62 illustrating an exemplary process used by the EMSC system 10 for generating e-mail messages with increased security. For the EMSC system 10, the process starts 64 when a user operating the computing device 14-1 creates an e-mail message 66. More specifically, the user continues by drafting the e-mail message, determining that the e-mail message includes contents requiring additional protection against fraudulent access by imposters, determining and associating a security level 34 with the e-mail message, determining control attributes for and assigning the control attributes to the e-mail message, and specifying recipients of the e-mail message. The user may also associate attachments with the e-mail message. After creating the e-mail message 66, the user continues by transmitting the e-mail message 66 to the CC system 18. The user operating the computing device 14-1 is the e-mail message sender, and the specified recipients are the users operating the computing devices 14-2 and 14-3. Thus, there are two specified recipients. It should be appreciated that the sender may alternatively specify any number of different recipients.

After receiving the e-mail message at the CC system 18, processing continues by determining whether the sender is enrolled in and activated by 68 the CC system 18. If not, the CC system 18 continues by transmitting a message 70 to the computing device 14-1 indicating that because the sender is not enrolled and activated, the sender cannot send and receive e-mail messages over the EMSC system 10. Next, the device 14-1 displays the message for the sender to see and processing ends 72.

However, when the sender is enrolled in and activated by the CC system 18, the CC system 18 continues by identifying 74 those specified recipients who are enrolled and activated by the CC system 18, and those that are not. Specified recipients who are not enrolled in and activated by the CC system 18 are prohibited from receiving the e-mail message. Consequently, the CC system 18 continues processing by removing each specified recipient from the e-mail message who is not enrolled and activated, and by transmitting a message to the computing device 14-1, for display, indicating which specified recipients can receive the e-mail message, and which cannot.

In response, the sender decides 76 whether the specified recipients prohibited from receiving the e-mail message should be invited to enroll in the CC system 18 and the BAC system 16. When the sender decides 76 to invite these specified recipients to enroll, the sender causes the computing device 14-1 to notify the CC system 18. The CC system 18 responds by generating and transmitting a message 78 inviting each of these specified recipients to enroll in the CC system 18 and the BAC system 16, and by conducting operation 80. Although an invitation is sent to the specified recipients who are not enrolled in and activated by the CC system 18, these specified recipients are still prohibited from receiving the e-mail message.

Otherwise, when the sender decides 76 not to the invite the specified recipients prohibited from receiving the e-mail message, the sender causes the computing device 14-1 to notify the CC system 18. In response, the CC system 18 continues processing by generating 80 an e-mail message identifier for the e-mail message, generating 80 a different transaction identifier for each enrolled and activated specified recipient, and obtaining 80 the e-mail addresses of the enrolled and activated specified recipients. Next, the CC system continues by storing 80 the generated e-mail message identifier, the generated transaction identifiers, and the obtained recipient identifiers in the transaction registry 42. By virtue of being stored in the transaction registry 42, the generated e-mail message identifier, the generated transaction identifiers, and the obtained recipient identifiers are associated with and map to each other. The CC system 18 also stores the e-mail message information 80 therein.

After storing the identifiers and e-mail message information 80, the CC system 18 continues by generating a modified e-mail message 82 from the e-mail message for each of the enrolled and activated specified recipients. More specifically, the CC system 18 continues processing by generating a different function that facilitates accessing the e-mail message contents for each enrolled and activated specified recipient, removing the contents from the e-mail message to thereby generate a modified e-mail message, generating a copy of the modified e-mail message for each specified recipient, and inserting a different function in a respective one of the modified e-mail messages. The functions each have embedded therein a respective one of the generated transaction identifiers. Moreover, the functions may be any function such as, but not limited to, a hyperlink or a script file. Next, the CC system 18 continues processing by storing the modified e-mail messages therein and transmitting each modified e-mail message 84 to the computing device 14-1, which continues by transmitting 84 the modified e-mail messages to the respective specified recipients through the e-mail server 20. Next, processing ends 72.

The modified e-mail messages as transmitted to the respective enrolled and activated specified recipients do not include the control attributes and thus are not displayed in accordance with the control attributes. Moreover, it should be understood that because the e-mail message contents are not included in the modified e-mail messages, the e-mail message contents are not stored with the modified e-mail messages in the CC system 18. It should be understood that one copy of the e-mail message contents is stored as part of the e-mail message information 80 in the CC system 18.

It should be understood that the transmitting messages operation 70 may include transmitting any type of message that facilitates increasing the security of e-mail message contents.

Figure 11:
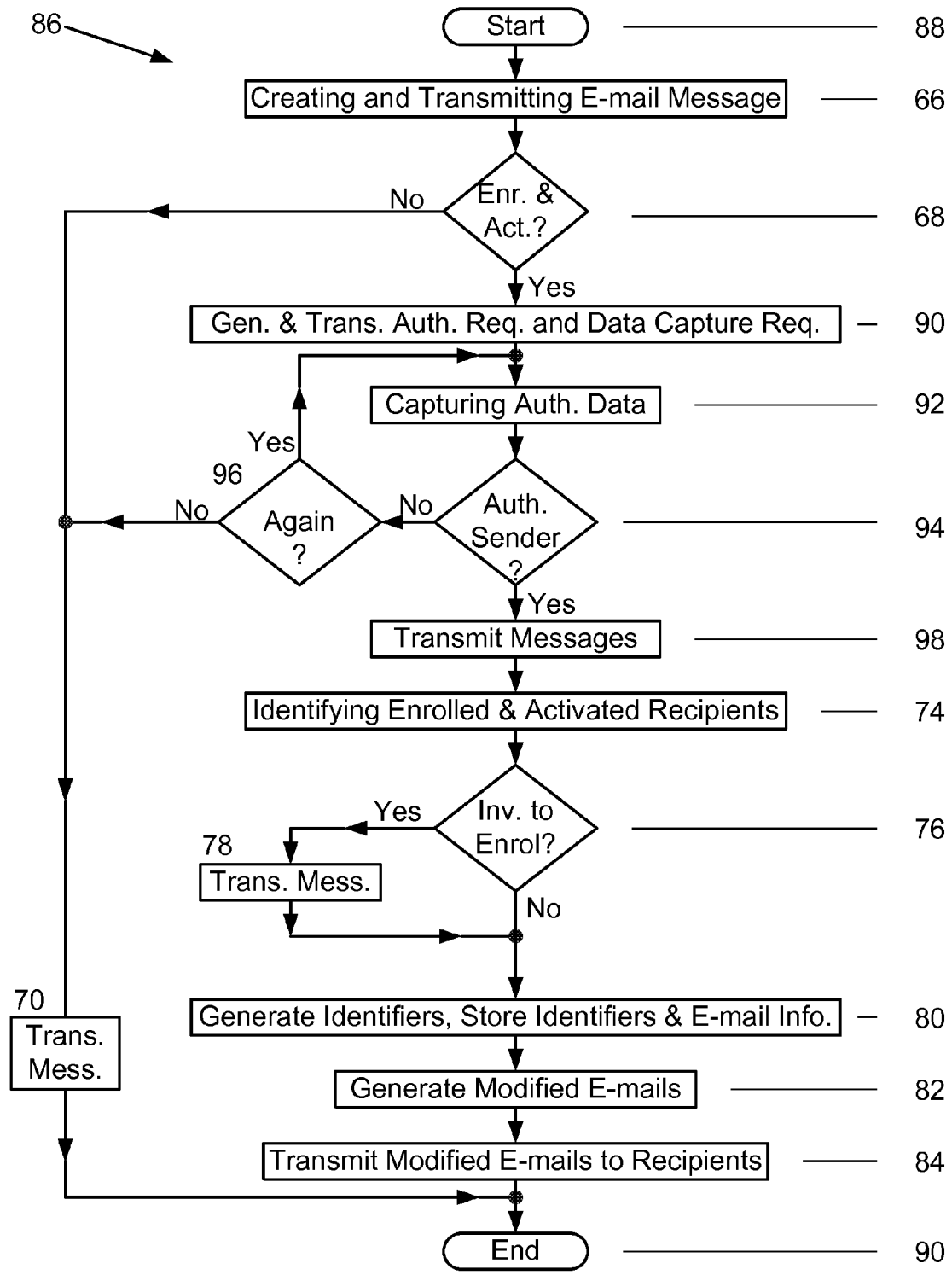
FIG. 11 is a flowchart illustrating an alternative exemplary process for generating e-mail messages with increased security.

The information shown in FIG. 11 is the same information shown in FIG. 10 as described in more detail below. As such, operations illustrated in FIG. 11 that are identical to operations illustrated in FIG. 10 are identified using the same reference numerals used in FIG. 10.

FIG. 11 is a flowchart 86 illustrating an alternative exemplary process used by the EMSC system 10 for generating e-mail messages with increased security. This alternative process is similar to that shown in FIG. 10. However, the sender is authenticated prior to identifying 74 those specified recipients enrolled in and activated by the CC system 18, and those who are not. For the EMSC system 10 this alternative process starts 88 by creating and transmitting the e-mail message 66 to the CC system 18, and determining whether the sender is enrolled in and activated by 68 the CC system 18. After determining that the sender is enrolled and activated 68, the CC system 18 continues processing by determining the security level 34 of the e-mail message, generating an authentication request message 90 that includes at least the security level 34 of the e-mail message and a request for the BAC system 16 to conduct an authentication transaction with the sender, and transmitting the authentication request message 90 to the BAC system 16.

After receiving the authentication request message, the BAC system 16 continues processing by extracting the security level 34 from the authentication request message, determining an authentication data requirement corresponding to the extracted security level, generating a data capture request message 90 that includes at least the authentication data requirement, and transmitting the data capture request message 90 to the communications device 12-1 of the sender. The communications device 12-1 continues processing by displaying the authentication data requirement for the sender to see. After reading the authentication data requirement, the sender continues by capturing authentication data 92 from his self with the communications device 12-1 in accordance with the authentication data requirement.

Next, the communications device 12-1 continues processing by transmitting the captured authentication data to the BAC system 16. In this alternative exemplary e-mail generation process, the security level 34 is high so the authentication data requirement 36 is for face and iris biometric data.

After receiving the captured authentication data, the BAC system 16 continues processing by determining whether the captured authentication data is of sufficient quality 94 for conducting an authentication transaction. When the captured authentication data is of sufficient quality 94, the BAC system 16 continues by authenticating the sender 94. When the captured authentication data matches the stored authentication data of the sender, the identity of the sender is successfully authenticated 94. Next, the BAC system 16 continues by determining that authentication data is not to be captured again 96, and by generating and transmitting a successful authentication message 98 to the CC system 18. In response, the CC system 18 continues processing by transmitting the successful authentication message 98 to the computing device 14-1 which displays the successful authentication message for the sender to see.

However, when the captured authentication data is of insufficient quality 94 or the sender is not successfully authenticated 94, the BAC system 16 determines that authentication data should be captured again 96. As a result, the BAC system continues processing by transmitting a message to the communications device 12-1 prompting the sender to again 96 capture authentication data 92 in accordance with the authentication data requirement. After reading the message from the device 12-1, the sender continues by capturing authentication data 92 from his self with the device 12-1 in accordance with the authentication data requirement, and the BAC system continues by determining whether the captured authentication data is of sufficient quality 94 for conducting an authentication transaction.

In this alternative exemplary process, authentication data may be captured 92 three times. After capturing authentication data 92 three times without successfully authenticating the identity of the sender 94, the BAC system 16 continues processing by determining that authentication data should not be captured again 96 because the sender cannot be successfully authenticated 94, and by transmitting a message 70 notifying the CC system 18 of the unsuccessful authentication. Next, the CC system 18 continues by transmitting a message 70 notifying the sender of the unsuccessful authentication, and processing ends 90. Alternatively, authentication data may be captured 92 any number of times before determining that the sender cannot be successfully authenticated 94.

After transmitting the successful authentication message 98, the CC system 18 continues processing by conducting operations 74, 76, 78, 80, 82, and 84 as described herein with regard to the exemplary message generation process illustrated in FIG. 10.

Authenticating the sender confirms that the sender is authorized to send e-mail messages to the specified recipients. Moreover, verifying that the sender is who he claims to be discourages authorized senders from fraudulently transmitting malicious e-mail messages using the identity of another different authorized user. As a result, the CC system 18 is facilitated to be protected against malicious e-mail messages and messages containing invalid data.

Figure 12:
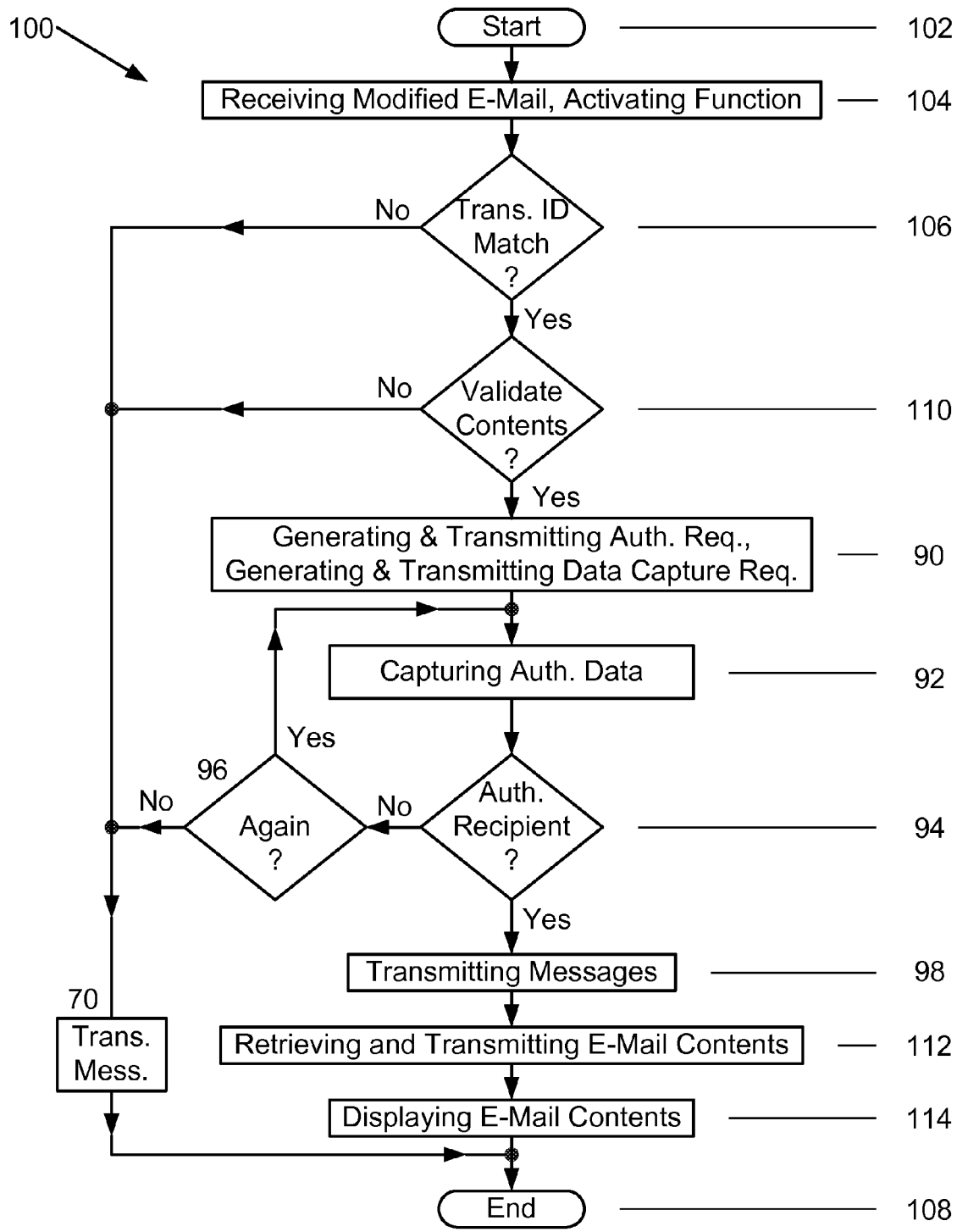
FIG. 12 is a flowchart illustrating an exemplary process for accessing contents of an e-mail message.

FIG. 12 is a flowchart 100 illustrating an exemplary process, used by a recipient of the modified e-mail message, for accessing the e-mail message contents stored in the CC system 18 corresponding to the modified e-mail message. As described in the exemplary e-mail message generation process, the e-mail message has two specified recipients, the users operating computing devices 14-2 and 14-3. However, because each of the specified recipients follows the same procedure for accessing e-mail contents, this exemplary accessing process is described with regard to one of the specified recipients, the specified recipient operating computing device 14-2.

The method starts 102 for the EMSC system 10 with the specified recipient operating the computing device 14-2 receiving a modified e-mail message 104 from the e-mail server 20. If the e-mail account program of the specified recipient is operating when the modified e-mail message is received, a notification message is displayed on the computing device 14-2 for the specified recipient to see. The notification message notifies the specified recipient regarding receipt of the modified e-mail message and prompts the specified recipient to proceed by clicking on, or otherwise activating, the function 104 included in the received modified e-mail message. Otherwise, if the e-mail account program of the specified recipient is not operating, the notification message appears when the e-mail account program of the specified recipient is next operating. By virtue of receiving he e-mail message, the specified recipients are determined to be enrolled in and activated by the CC system 18.

After reading the notification message, the specified recipient indicates a desire to access the e-mail message contents by activating the function 104, which causes the computing device 14-2 to communicate with the CC system 18. Next, the CC system 18 continues processing by determining whether the e-mail message contents are stored therein. More specifically, the CC system 18 continues by extracting the transaction identifier from the activated function and comparing the extracted transaction identifier 106 against those included in the transaction registry 42. When the extracted transaction identifier matches a transaction identifier 106 included in the transaction registry 42, the CC system 18 continues processing by determining that the e-mail contents are stored therein and by mapping the extracted transaction identifier to an e-mail message identifier and a recipient identifier. Otherwise, when the extracted transaction identifier does not have a match 106, the CC system 18 continues processing by transmitting a message 70 to the computing device 14-2 notifying the specified recipient that the e-mail message cannot be accessed. Next, processing ends 108.

After mapping the extracted transaction identifier to an e-mail message identifier and a recipient identifier, the CC system 18 continues processing by validating 110 the e-mail message contents associated with the mapped e-mail identifier. Validating the e-mail message contents 110 includes, but is not limited to, verifying that the contents have not expired and can still be accessed, verifying that the contents have not been disabled, and verifying that the contents have not been deleted. When the e-mail message contents are not validated 110, processing continues by transmitting a message 70 to the computing device 14-2 notifying the specified recipient that the e-mail message contents cannot be accessed. Next, processing ends 108.

However, when the e-mail message contents are validated 110, processing continues by authenticating the identity of the specified recipient by conducting operations 90, 92, 94, 96, 98, and 70 as described herein with regard to the exemplary e-mail generation process illustrated in FIG. 11. More specifically, the CC system 18 continues processing by determining the security level 34 of the e-mail message contents, generating an authentication request message 90 that includes at least the security level 34 of the e-mail message contents and a request for the BAC system 16 to authenticate the specified recipient, and transmitting the authentication request message 90 to the BAC system 16.

After receiving the authentication request message, the BAC system 16 continues processing by extracting the security level 34 from the authentication request message, determining an authentication data requirement corresponding to the extracted security level, generating a data capture request message 90 that includes at least the authentication data requirement, and transmitting the data capture request message 90 to the communications device 12-3 of the recipient. The communications device 12-3 continues processing by displaying the authentication data requirement for the recipient to see. After reading the authentication data requirement, the specified recipient continues by capturing authentication data 92 from his self with the communications device 12-3 in accordance with the authentication data requirement.

When a successful authentication message is transmitted from the BAC system 16 to the CC system 18 as a result of conducting operations 92, 94, 96, 98, and 70, the CC system 18 continues processing by determining that the recipient is authorized to access the e-mail message contents. Moreover, the CC system 18 continues by retrieving 112 the e-mail message contents and the control attributes of the modified e-mail message transmitted to the recipient operating device 14-2, by assigning the retrieved control attributes to the e-mail message contents, and by transmitting 112 the e-mail message contents to the computing device 14-2. Next, the computing device 14-2 continues processing by displaying the e-mail message contents 114 in accordance with the retrieved control attributes for the specified recipient to see. More specifically, the computing device 14-2 continues by displaying the drafted message included in the e-mail message with any attachments for the specified recipient to see, while executing the retrieved control attributes assigned to the e-mail message contents. Next, processing ends 108.

Although the exemplary e-mail content accessing process ends 108 after displaying the e-mail message contents 114, in alternative e-mail content accessing processes the recipient may also be permitted to access the e-mail contents of different e-mail messages associated with the recipient after the e-mail message contents are displayed 114. In such alternative processes, the computing device 14-2 may communicate with the CC system 18 such that the computing device 14-2 displays a list of e-mail messages of the recipient having a security level 34 equal to or less than the security level 34 of the received modified e-mail message. Next, the recipient may continue by selecting at least one of the listed e-mail messages to read. The computing device 14-2 continues processing by displaying the contents associated with the selected e-mail message for the recipient to see.

The recipient may view any number of the displayed e-mail messages for a time period that starts upon successful authentication 90. The time period may be of any duration, for example, five minutes, that facilitates increasing the security of e-mail message contents against access by imposters. Moreover, when the recipient selects more than one e-mail message from the list, each of the selected messages may be simultaneously displayed. However, after expiration of the time period, the e-mail messages are no longer displayed for the recipient to read.

Although the specified recipient activates the function 104 in response to the notification message in the exemplary e-mail content accessing process, in alternative e-mail content accessing processes upon receiving the modified e-mail message, the computing device 14-2 may automatically communicate with the CC system 18 such that the CC system 18 continues by determining whether the e-mail message contents are stored therein. In such alternative processes, a notification message is not generated and transmitted, the recipient is not presented with the function and thus does not activate the function, and the e-mail account program of the specified recipient is required to be operating. It should be understood that in alternative e-mail content accessing processes, the CC system 18 may determine whether the e-mail message contents are stored therein in any manner.

Figure 13:
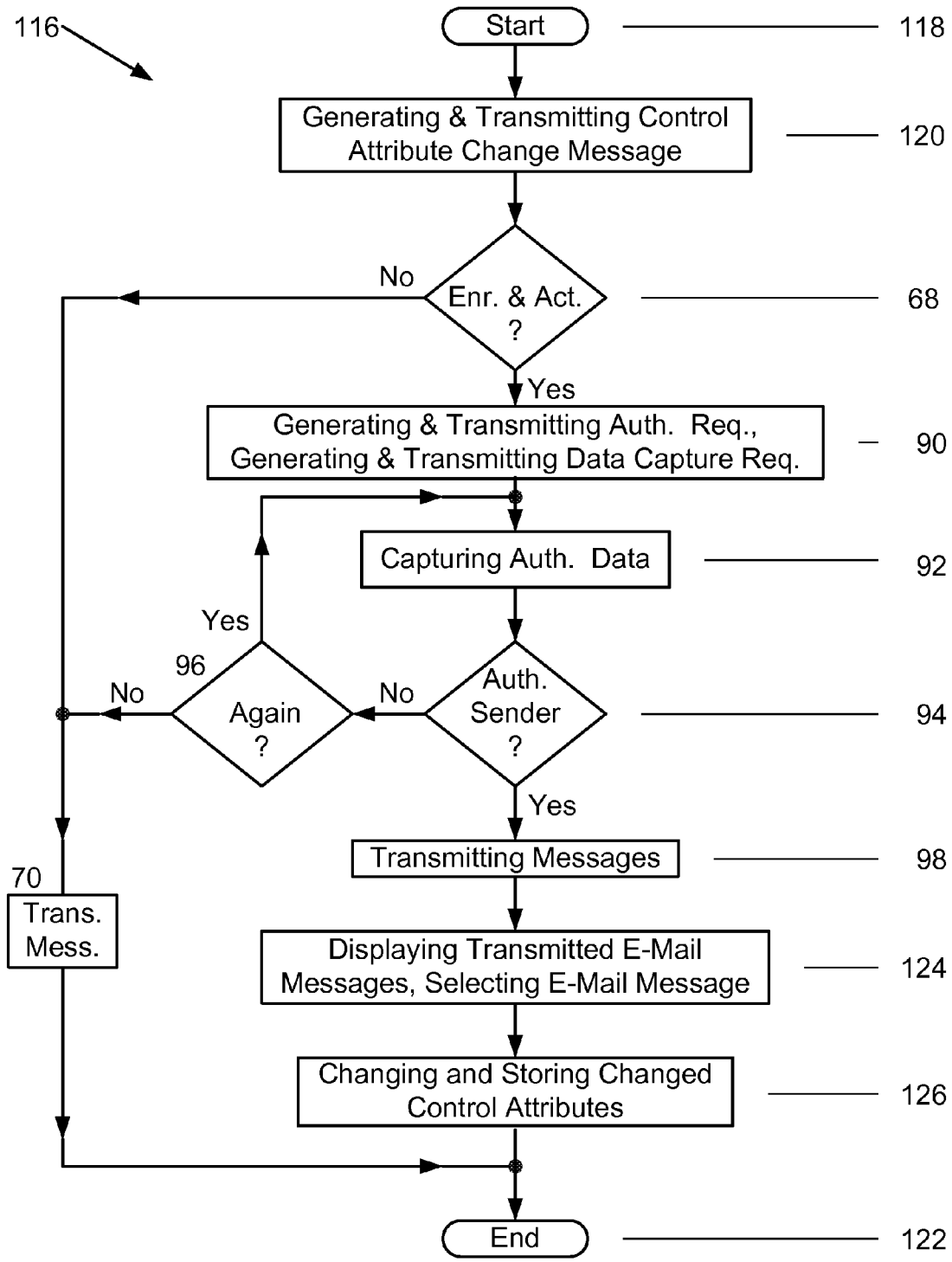
FIG. 13 is a flowchart illustrating an exemplary process for changing control attributes of an e-mail message after transmission.

FIG. 13 is a flowchart 116 illustrating an exemplary process for changing control attributes of an e-mail message after transmission by the sender. The method starts 118 for EMSC system 10 with the sender operating computing device 14-1 deciding that at least one control attribute assigned to a transmitted e-mail message is to be changed. Next, the sender operates the computing device 14-1 to indicate a desire to change the at least one control attribute by generating a control attribute change message 120 and transmitting the control attribute change message 120 to the CC system 18.

After receiving the control attribute change message, the CC system 18 continues processing by determining whether the sender is enrolled and activated by conducting operation 68 as described herein with regard to FIG. 10. If the sender is not enrolled and activated 68, the CC system 18 continues by transmitting a message 70 to the computing device 14-1 indicating that the sender cannot send and receive e-mail messages, and cannot change control attributes of e-mail messages. Next, the device 14-1 displays the message for the sender to see and processing ends 122.

However, when the sender is enrolled in and activated 68 by the CC system 18, processing continues by conducting operations 90, 92, 94, 96, 98, and 70 as described herein with regard to the exemplary e-mail message generation process illustrated in FIG. 11. More specifically, the CC system 18 continues processing by determining the security level 34 of the e-mail message contents, generating an authentication request message 90 that includes at least the security level 34 of the e-mail message contents and a request for the BAC system 16 to authenticate the sender, and transmitting the authentication request message 90 to the BAC system 16. After receiving the authentication request message, the BAC system 16 continues processing by extracting the security level 34 from the authentication request message, determining an authentication data requirement corresponding to the extracted security level, generating a data capture request message 90 that includes at least the authentication data requirement, and transmitting the data capture request message 90 to the communications device 12-1 of the sender.

The communications device 12-1 continues processing by displaying the authentication data requirement for the sender to see. After reading the authentication data requirement, the sender continues by capturing authentication data 92 from his self with the communications device 12-1 in accordance with the authentication data requirement.

When a successful authentication message is transmitted from the CC system 18 to the computing device 14-1 as a result of conducting operations 92, 94, 96, 98, and 70, the computing device 14-1 continues processing by displaying the successful authentication message and transmitted e-mail messages 124 of the sender for the sender to see. Modified e-mail messages generated from e-mail messages transmitted by the sender and stored in the CC system 18 may also be displayed. Moreover, any number of e-mail messages transmitted by the sender may be displayed.

The sender continues by selecting the transmitted e-mail message 124 whose control attributes require changing. Next, the computing device 14-1 continues by presenting the display screen 44 for the sender to see. The sender continues by indicating that control attributes of the selected e-mail message are to be changed. In response, the computing device 14-1 continues by presenting the control attribute display screen 46 for the sender to see. Next, the sender continues by changing at least one of the control attributes 126 on the display screen 46. The computing device 14-1 then continues processing by transmitting control attributes, including the changes, to the CC system 18 which continues processing by storing the changed control attributes 126. Next, processing ends 122.

The exemplary processes described herein include operations performed by, and communications sent between, components of the ESMC system 10 that facilitate enabling increased sender control over e-mail messages after transmission and facilitate increasing the security of e-mail messages against imposter access. Because communications of the computing devices 14-*n* occur over the first communications channel and communications of the communications devices 12-*m* occur over the second communications channel, communications of the computing devices 14-*n* are out-of-band with communications of the communications devices 12-*m* in the exemplary processes described herein. However, a user may not have access to both his communications device 12-*m* and a computing device 14-*n* when desiring to conduct any of the processes described herein. Consequently, in alternative exemplary embodiments, the processes described herein may be conducted with either the communications device 12-*m* of a user or a computing device 14-*n* operated by the user. Because either a communications device 12-*m* or a computing device 14-*n* is used in such alternative embodiments, one device is used. As a result, it should be understood that communications of such alternative embodiments are not conducted out-of-band. Instead, communications of such alternative embodiments are conducted in-band over the communications channel of the one device.

Figure 14:
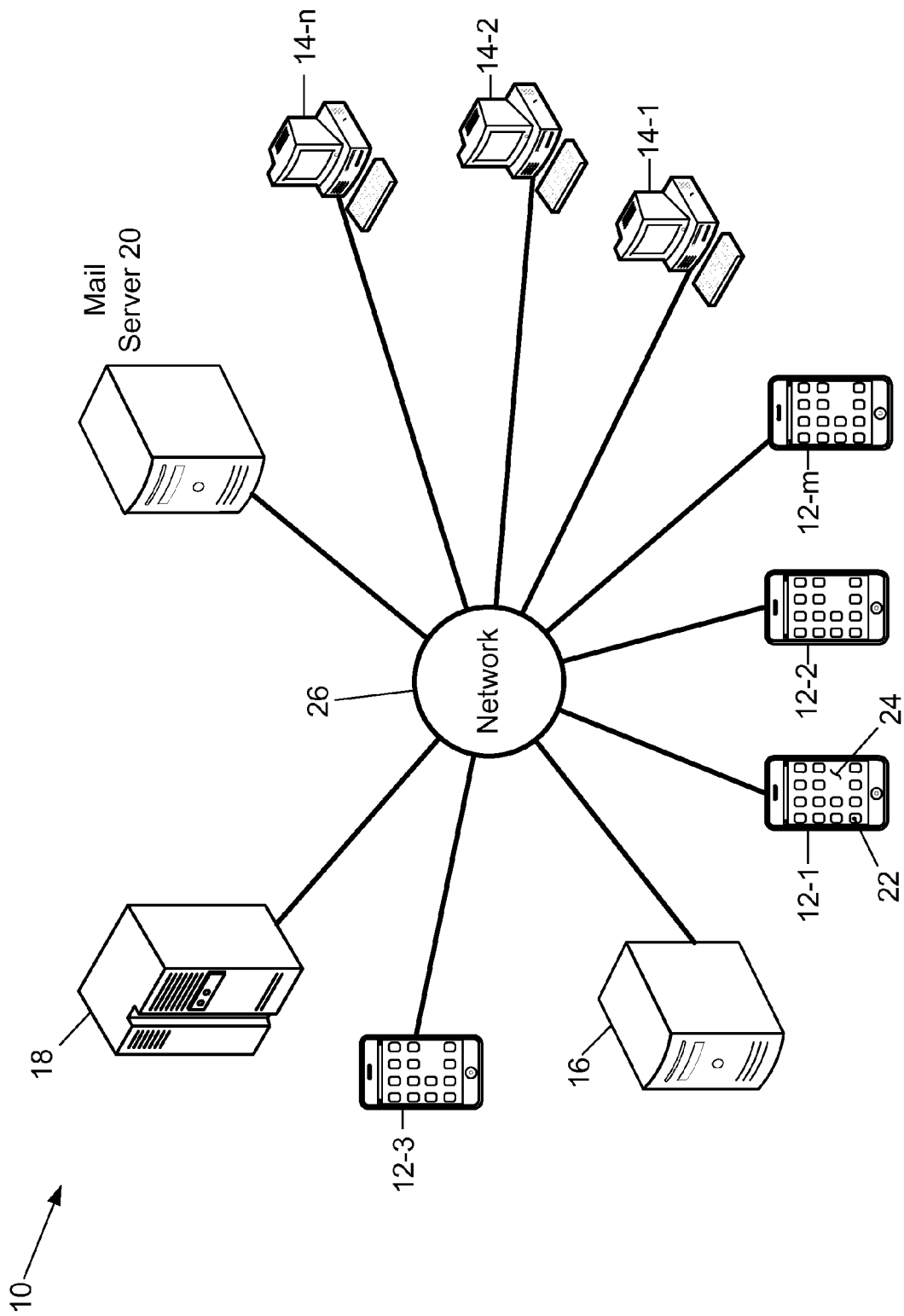
FIG. 14 is a diagram of an alternative exemplary embodiment of the e-mail security computer system for increasing the security of electronic messages against access by imposters.

The information shown in FIG. 14 is the same information shown in FIG. 1 as described in more detail below. As such, components illustrated in FIG. 14 that are identical to components illustrated in FIG. 1, are identified using the same reference numerals used in FIG. 1.

FIG. 14 is a diagram of an alternative exemplary embodiment of the EMSC system 10 for increasing the security of electronic messages against access by imposters. This alternative embodiment is similar to that shown in FIG. 1. However, the communications devices 12-*m*, the CC system 18, and the e-mail server 20 are also configured to communicate with each other over the network 26. Moreover, the computing devices 14-*n* are also configured to communicate with the BAC system 16 over the network 26. This alternative EMSC system 10 facilitates using either a communications device 12-*m* or a computing device 14-*n* operated by the user to conduct the exemplary e-mail message generation process, the exemplary content accessing process, and the exemplary control attribute changing process. In this alternative EMSC system 10, the communications device 12-*m* of a user may perform all operations described herein with regard to a computing device 14-*n* operated by the user when a computing device 14-*n* is unavailable. Likewise, a computing device 14-*n* operated by the user may perform all operations described herein with regard to the communications device 12-*m* of the user when the communications device 12-*m* of the user is unavailable. As a result, this alternative EMSC system 10 enables conducting any of the exemplary processes described herein, as an in-band process, with either the communications device 12-*m* of a user or a computing device 14-*n* operated by a user.

Figure 15:
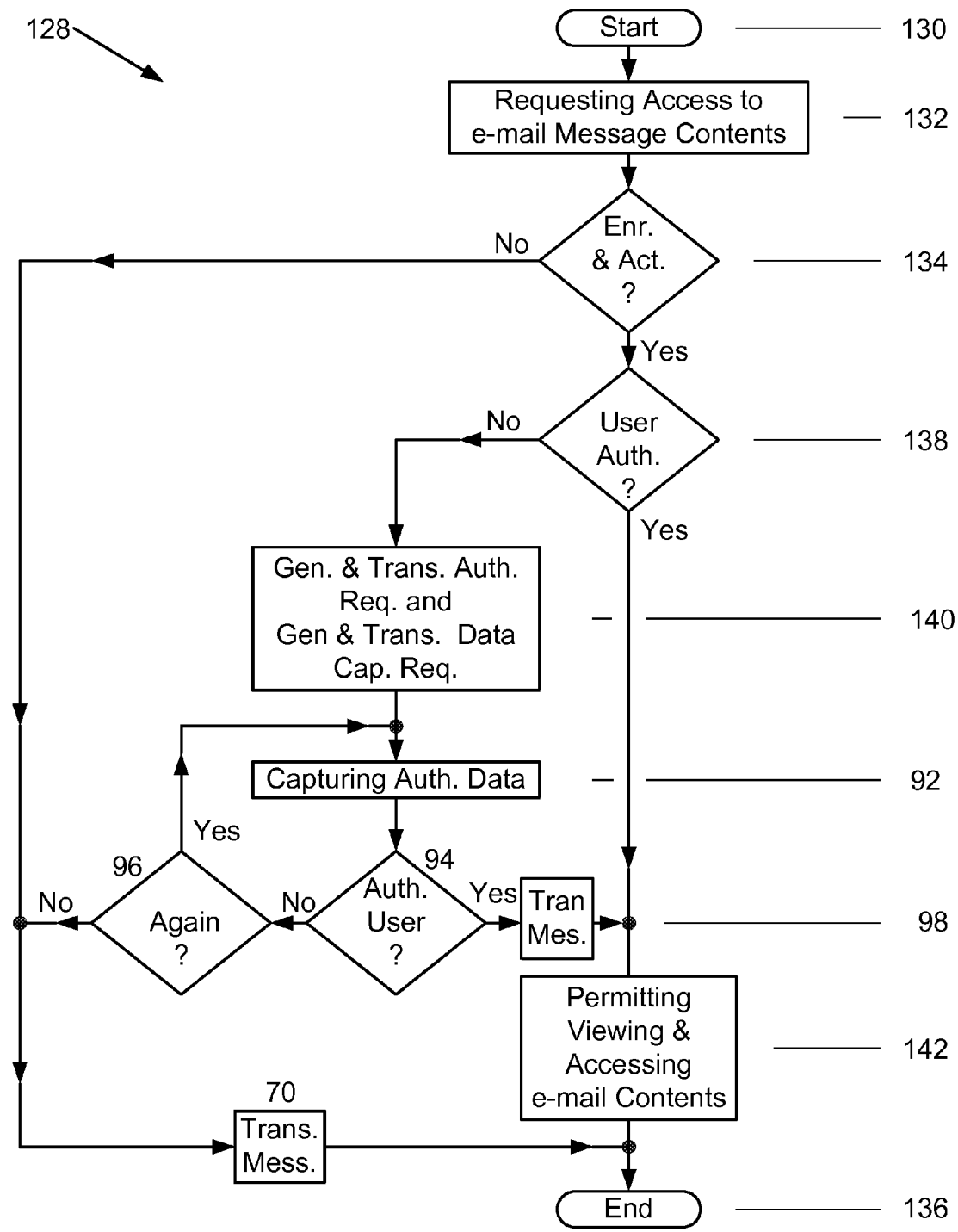
FIG. 15 is a flowchart illustrating an exemplary in-band process for accessing contents of e-mail messages directly from a control computer system.

FIG. 15 is a flowchart 128 illustrating an exemplary in-band process for accessing e-mail message contents directly from the CC system 18. For the alternative EMSC system 10, the process starts 130 when a user decides to access e-mail message contents directly from the CC system 18 with his communications device 12-3. The user proceeds by causing the communications device 12-3 to transmit an access request message to the CC system 18 requesting access 132 to the e-mail message contents of the user stored therein. The user operating his communications device 12-3 is the recipient of the e-mail message contents.

After receiving the access request message, the CC system 18 continues processing by determining whether the recipient is enrolled in and activated by 134 the CC system 18. If not, the CC system 18 continues by transmitting a message 70 to the communications device 12-3 indicating that because the recipient is not enrolled in and activated by the CC system 18, the recipient cannot access e-mail messages over the EMSC system 10. Next, the device 12-3 displays the message for the recipient to see and processing ends 136.

However, when the recipient is enrolled in and activated by 134 the CC system 18, the CC system 18 continues processing by determining whether the recipient was successfully authenticated within a time period immediately preceding transmission of the access request message 132. The time period may be of any duration, for example, five minutes, that facilitates increasing the security of e-mail message contents against access by imposters.

When the recipient was successfully authenticated 138 within the time period, the CC system 18 continues processing by determining the security level 34 of the successful authentication and permitting the recipient to view 142 a list of all his e-mail messages. The recipient is permitted to access 142 the contents of those e-mail messages included in the list having a security level 34 less than or equal to the security level 34 of the successful authentication. The recipient continues by selecting an e-mail message to access 142 having a security level 34 less than or equal to the security level 34 of the successful authentication. Next, the CC system 16 and communications device 12-3 communicate such that the drafted message and attachments of the selected e-mail message are displayed for the recipient to see, while executing the control attributes assigned to the selected e-mail message. Next, processing ends 136.

When the recipient was not successfully authenticated 138 within the time period, the CC system 18 continues processing by determining 140 a security level 34 required for viewing the list, generating 140 an authentication request message and transmitting 140 the authentication request message to the BAC system 16. The authentication request message includes a security level 34 and requests that the BAC system 16 conduct an authentication transaction with the recipient. The security level 34 included in the authentication request message is the lowest security level 34. However, the security level 34 included in the authentication request message may be a higher security level 34.

After receiving the authentication request, the BAC system 16 continues processing by extracting the security level 34 therefrom, determining an authentication data requirement corresponding to the extracted security level, generating a data capture request message 140 that includes at least the authentication data requirement, and transmitting the data capture request message 140 to the communications device 12-3 for the recipient to see. Next, processing continues by authenticating the identity of the recipient by conducting operations 92, 94, 96, 98, and 70 as described herein with regard to the exemplary e-mail message generation process illustrated in FIG. 11. It should be understood that the recipient captures authentication data from his self with his communications device 12-3.

After receiving a successful authentication message from the BAC system 16 as a result of conducting operations 92, 94, 96, 98, and 70, the CC system 18 continues processing by permitting the recipient to view 142 a listing of all his e-mail messages and access 142 the contents of those e-mail messages having a security level 34 less than or equal to the security level 34 included in the authentication request message. The recipient continues by selecting an e-mail message to access having a security level 34 less than or equal to the security level 34 included in the authentication request message. Next, the CC system 16 communicates with the communications device 12-3 such that the drafted message and attachments of the selected e-mail message are displayed for the recipient to see, while executing the control attributes assigned to the e-mail message. Next, processing ends 136.

Figure 16:
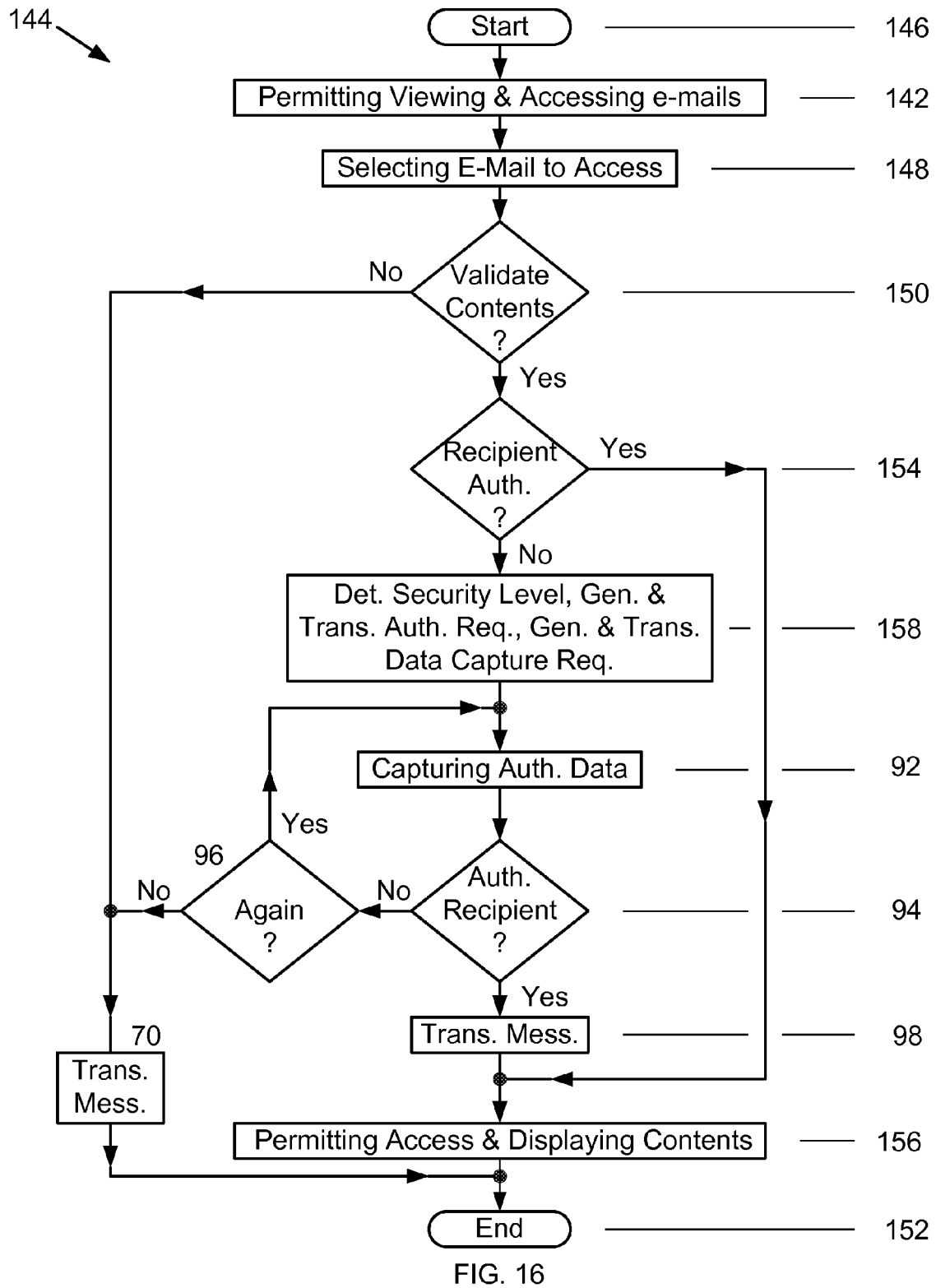
FIG. 16 is a flowchart illustrating another alternative exemplary in-band process for accessing contents of e-mail messages directly from a control computer system.

FIG. 16 is a flowchart 144 illustrating another alternative exemplary in-band process for accessing e-mail message contents directly from the CC system 18. For the alternative EMSC system 10, this process starts 146 after an e-mail recipient receives permission to view and access his e-mail messages 142 as a result of conducting the exemplary in-band process for accessing e-mail messages as described herein with regard to FIG. 15. Next, the recipient continues by selecting an e-mail message 148 to access that has a security level 34 greater than the security level 34 included in the authentication request message generated in operation 140 as described in the exemplary in-band process with regard to FIG. 15. In response, the CC system 18 continues processing by validating 150 the contents of the selected e-mail message. When the e-mail message contents are not validated 150, the CC system 18 continues processing by transmitting a message 70 to the communications device 12-3 notifying the recipient that the e-mail message contents cannot be accessed. Next, processing ends 152.

However, when the contents of the selected e-mail message are validated 150, the CC system 18 continues processing by determining whether the recipient was successfully authenticated 154 to the security level of the selected e-mail message within a time period immediately preceding selection of the e-mail message 148. The time period may be of any duration, for example, five minutes, that facilitates increasing the security of e-mail message contents against access by imposters.

When the recipient was successfully authenticated within the time period 154, the CC system 18 continues processing by permitting the recipient to access and view the contents 156 of the selected e-mail message. Moreover, the CC system 18 communicates with the communications device 12-3 to display the contents of the selected e-mail message 156 in accordance with the control attributes associated with the e-mail. More specifically, the communications device 12-3 continues by displaying the drafted message included in the selected e-mail message with any attachments for the recipient to read, while executing the control attributes assigned to the contents of the selected e-mail message. Next, processing ends 152.

When the recipient was not successfully authenticated 154 within the time period, the CC system 18 continues processing by determining the security level 34 of the selected e-mail message 158, generating an authentication request message 158 that includes at least the security level 34 of the selected e-mail message and a request for the BAC system 16 to authenticate the recipient, and transmitting 158 the authentication request message to the BAC system 16. Next, the BAC system 16 continues processing by determining an authentication data requirement corresponding to the extracted security level, generating a data capture request message 158 that includes at least the authentication data requirement, and transmitting the data capture request message 158 to the communications device 12-3 for the recipient to see. Next, processing continues by authenticating the identity of the recipient by conducting operations 92, 94, 96, 98, and 70 as described herein with regard to the exemplary e-mail message generation process illustrated in FIG. 11. It should be understood that the recipient captures authentication data from his self with his device 12-3.

After receiving a successful authentication message from the BAC system 16 as a result of conducting operations 92, 94, 96, 98, and 70, the CC system 18 continues processing by permitting the recipient to access and view the contents 156 of the selected e-mail message. Moreover, the CC system 18 communicates with the communications device 12-3 to display 156 the contents of the selected e-mail message in accordance with the control attributes associated with the e-mail. More specifically, the communications device 12-3 continues by displaying the drafted message included in the selected e-mail message with any attachments for the recipient to read, while executing the control attributes assigned to the contents of the selected e-mail message. Next, processing ends 152.

In each of the exemplary in-band processes for accessing e-mail contents described herein, the recipient may view any number of the listed e-mail messages for any time period, for example, five minutes, after being successfully authenticated. Moreover, when the recipient selects more than one e-mail message from the list, each of the selected messages may be simultaneously displayed. However, after expiration of the time period, the e-mail messages are no longer displayed. In yet other alternative content accessing processes, recipients may access and read the selected e-mail message contents for any period of time that starts upon successful authentication.

Figure 17:
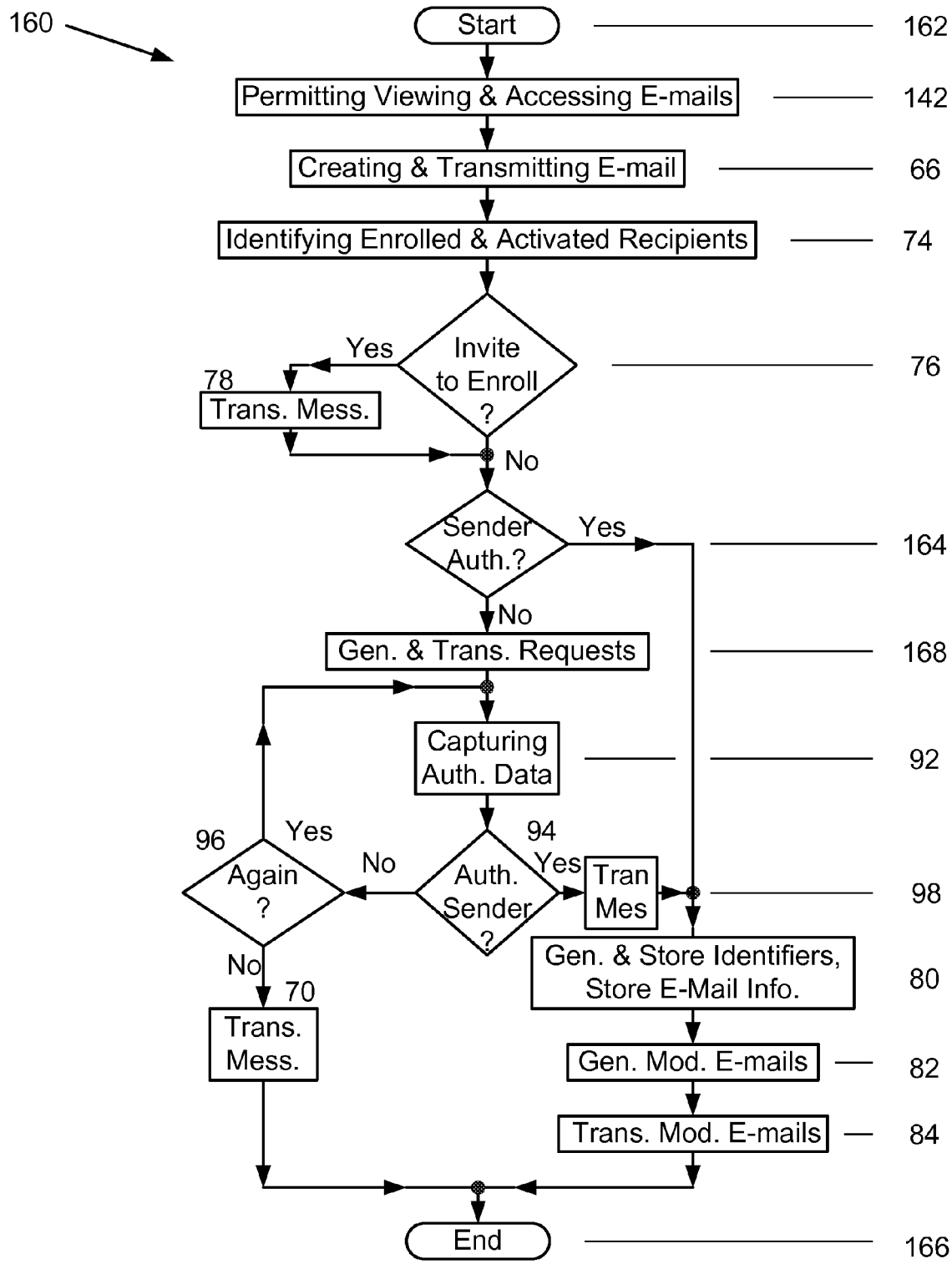
FIG. 17 is a flowchart illustrating an alternative exemplary in-band process for generating e-mail messages with increased security.

Some of the information shown in FIG. 17 is the same information shown in FIGS. 10 and 11 as described in more detail below. As such, operations illustrated in FIG. 17 that are identical to operations illustrated in FIGS. 10 and 11 are identified using the same reference numerals used in FIGS. 10 and 11.

FIG. 17 is a flowchart 160 illustrating an alternative exemplary in-band process for generating e-mail messages with increased security. For the alternative EMSC system 10, this process starts 162 when a user receives permission to view and access his e-mail messages 142 as a result of conducting the exemplary in-band process for accessing e-mail messages as described herein with regard to FIG. 15. Next, the user continues by creating an e-mail message 66 and transmitting the e-mail message 66 to the CC system 18. The user operates the communications device 12-1 and is the e-mail message sender. The specified recipients are the users operating communications devices 12-2 and 12-3. Alternatively, the sender may specify any number of different recipients.

After receiving the e-mail message, the CC system 18 continues processing by conducting operations 74, 76, and 78. Next, the CC system 18 continues by determining whether the sender was successfully authenticated 164 within a time period immediately preceding transmission of the e-mail message 66. The time period may be of any duration, for example, five minutes, that facilitates increasing the security of e-mail message contents against access by imposters.

When the sender was successfully authenticated 164 within the time period, the CC system 18 continues processing by conducting operations 80, 82, and 84. After storing the modified e-mail messages therein, the CC system 18 continues by transmitting 84 each modified e-mail message to the communications device 12-1 which continues by transmitting 84 the modified e-mail messages to the specified respective recipients through the e-mail server 20. Next, processing ends 166.

When the sender was not successfully authenticated 164 within the time period, the CC system 18 continues processing by determining the security level 34 of the created e-mail message 168, generating an authentication request message 168 that includes at least the security level 34 of the selected e-mail message and a request for the BAC system 16 to authenticate the sender, and transmitting 168 the authentication request message to the BAC system 16. Next, the BAC system 16 continues processing by determining an authentication data requirement corresponding to the extracted security level, generating a data capture request message 168 that includes at least the authentication data requirement, and transmitting the data capture request message 168 to the communications device 12-1. Next, processing continues by authenticating the identity of the sender by conducting operations 92, 94, 96, 98, and 70 as described herein with regard to the exemplary e-mail message generation process illustrated in FIG. 11.

After receiving a successful authentication message from the BAC system 16 as a result of conducting operations 92, 94, 96, 98, and 70, the CC system 18 continues processing by conducting operations 80, 82, and 84. After storing the modified e-mail messages therein, the CC system 18 continues by transmitting 84 each modified e-mail message to the communications device 12-1 which continues by transmitting 84 the modified e-mail messages to the specified respective recipients through the e-mail server 20. Next, processing ends 166.

Figure 18:
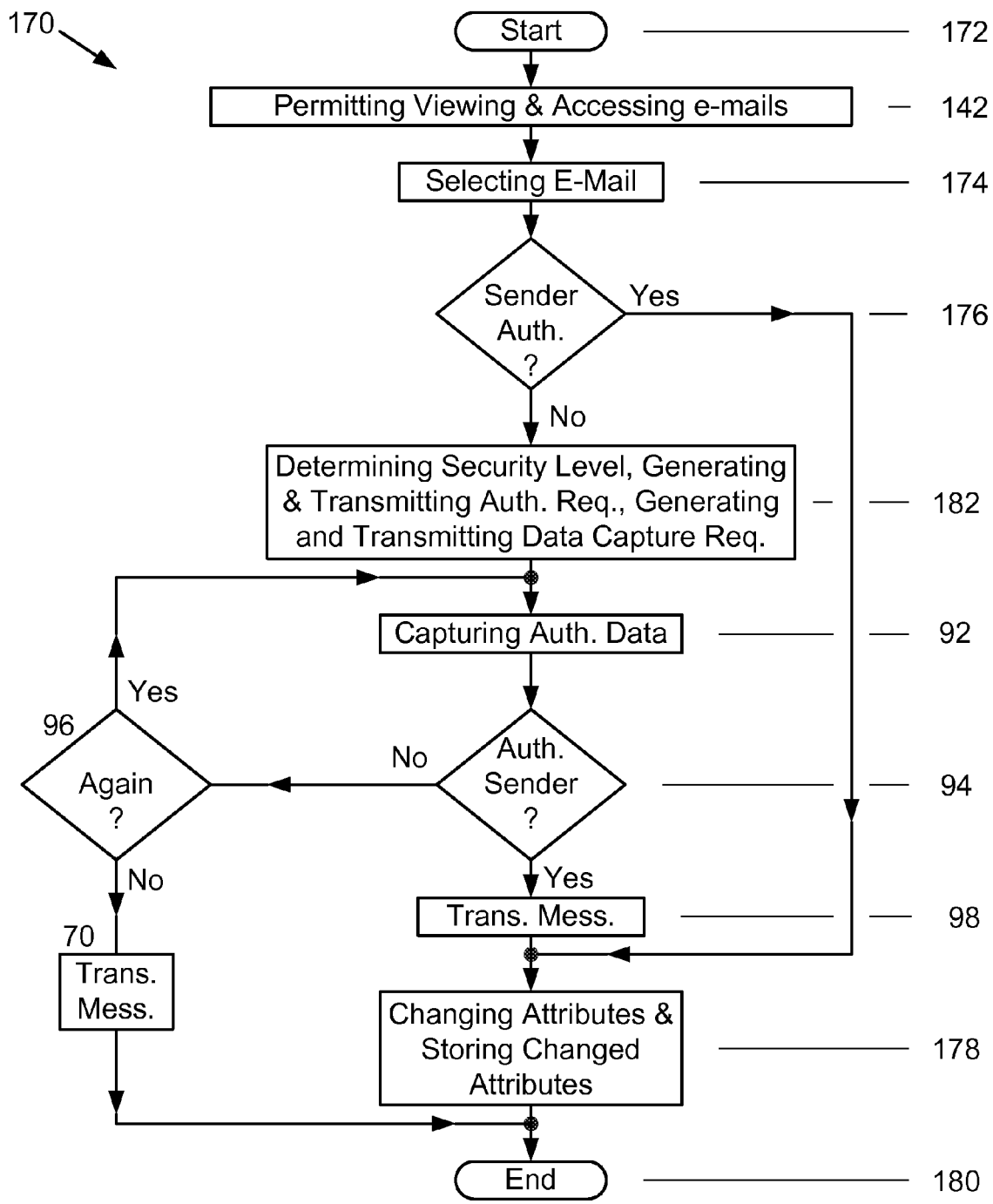
FIG. 18 is a flowchart illustrating an alternative exemplary in-band process for changing control attributes of an e-mail message after transmission.

FIG. 18 is a flowchart 170 illustrating an alternative exemplary in-band process for changing control attributes of an e-mail message after transmission by the sender. The method starts 172 for alternative EMSC system 10 with a sender deciding that at least one control attribute assigned to a transmitted e-mail message is to be changed. Next, the sender continues by conducting the exemplary process for accessing e-mail messages as described herein with regard to FIG. 15 and is permitted to view and access his e-mail messages 142. It should be appreciated that modified e-mail messages generated from e-mail messages transmitted by the sender may also be displayed, and that any number of e-mail messages transmitted by the sender may be displayed.

The sender continues by selecting the transmitted e-mail message 174 whose control attributes require changing. Next, the communications device 12-1 continues by presenting the display screen 44 for the sender to see. The sender continues by indicating that control attributes of the selected e-mail message are to be changed. In response, the communications device 12-1 continues by presenting the control attribute display screen 46 for the sender to see.

Next, the CC system 18 continues processing by determining whether the sender was successfully authenticated 176 within a time period immediately preceding selection of the e-mail message 174. The time period may be of any duration, for example, five minutes, that facilitates increasing the security of e-mail message contents against access by imposters.

When the sender was successfully authenticated 176 within the time period, the CC system 18 continues processing by transmitting a successful authentication message to the communications device 12-1. Next, the sender continues by changing at least one of the control attributes 178 in the control attribute display screen 46. The communications device 12-1 transmits the control attribute changes to the CC system 18 which continues processing by storing the changed control attributes 178. Next, processing ends 180.

When the sender was not successfully authenticated 176, the CC system 18 continues processing by determining the security level 34 of the selected e-mail message 182, generating an authentication request message 182 that includes at least the security level 34 of the selected e-mail message and a request for the BAC system 16 to authenticate the sender, and transmitting 182 the authentication request message to the BAC system 16. Next, the BAC system 16 continues processing by determining an authentication data requirement corresponding to the extracted security level, generating a data capture request message 182 that includes at least the authentication data requirement, and transmitting the data capture request message 182 to the communications device 12-1. Next, processing continues by authenticating the identity of the sender by conducting operations 92, 94, 98, and 70 as described herein with regard to the exemplary e-mail message generation process illustrated in FIG. 11.

After receiving a successful authentication message from the BAC system 16 as a result of conducting operations 92, 94, 96, 98, and 70, the CC system 18 continues processing by transmitting the successful authentication message to the communications device 12-1. Next, the sender continues by changing at least one of the control attributes 178 in the control attribute display screen 46. The communications device 12-1 transmits the control attribute changes to the CC system 18 which continues processing by storing the changed control attributes 178. Next, processing ends 180.

In each of the exemplary attribute changing processes described herein, by virtue of including the modified e-mail messages in the display for the sender to see, the CC system 18 facilitates enabling the sender to include different control attributes in the modified e-mail message for each specified recipient. Thus, the sender is enabled to control e-mail message security for each specified recipient separately.

Although the sender changes at least one control attribute in the exemplary control attribute changing processes described herein, in alternative attribute changing processes the sender may change the control attributes by assigning at least one additional different control attribute to the e-mail message or may remove at least one control attribute from the e-mail message. After changing the control attributes of an e-mail message, the e-mail message is displayed in accordance with the changed control attributes.

Although the authentication data is captured with the communications device in the exemplary processes described herein, in alternative processes the authentication data may be captured by the computing device.

The BAC system 16 determines whether captured authentication data is of sufficient quality for conducting an authentication transaction in the exemplary processes described herein. However, in alternative processes the communications devices may determine whether the captured authentication data is of sufficient quality for conducting an authentication transaction. In such alternative processes, after determining that captured authentication data is of sufficient quality the communications device transmits it to the BAC system 16. However, when the captured data is insufficient, the communications devices may display a message prompting the sender to again capture authentication data in accordance with the authentication data requirement until sufficient quality authentication data is captured. The communication devices may also process the captured authentication data prior to transmitting it to the BAC system 16. For example, the communications devices may capture biometric authentication data, create a biometric template for the captured data, and then transmit the biometric template to the BAC system 16. In other alternative processes, any component of the EMSC system 10 may determine the quality of captured authentication data.

Although the security level 34 is included in the authentication request message and is used to determine the authentication data requirement in the exemplary processes described herein, in alternative processes instead of including the security level 34 in the authentication request message any information that may be used to determine the authentication data requirement may be included in the authentication request message. Moreover, in alternative processes, the security level of an e-mail message may be determined through configuration instead of being determined by the sender.

The above-described methods for generating e-mail messages, accessing contents of e-mail messages, and controlling attributes of e-mail messages facilitate increasing the security of e-mail messages against fraudulent access by imposters and facilitate reducing inadvertent distribution of e-mail message information by recipients. More specifically, after receiving an e-mail message at a control system, the control system checks that the specified recipients of the e-mail message are enrolled in and are activated by the control system, stores information regarding the e-mail message, generates modified e-mail messages, and transmits a different one of the modified e-mail messages to each specified recipient. After successfully authenticating a specified recipient, the specified recipient is permitted to access and view the e-mail message contents in accordance with control attributes assigned to the received modified e-mail message.

Each of the control attributes of an e-mail message stored in the control system may be changed after the e-mail is transmitted by the sender. More specifically, after successfully authenticating the sender, the sender may access and change the control attributes of a previously transmitted e-mail message. As a result, the security of e-mail messages is facilitated to be increased against fraudulent access by imposters, inadvertent distribution of e-mail message information is facilitated to be reduced, and electronic mail security system performance is facilitated to be enhanced in a cost effective and reliable manner.

Exemplary embodiments of systems and processes for increasing the security of e-mail messages against fraudulent access by imposters are described above in detail. The processes are not limited to use with the specific computer system embodiments described herein, but rather, the processes can be utilized independently and separately from other processes described herein. Moreover, the invention is not limited to the embodiments of the systems and processes described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:
1. A method for increasing e-mail security comprising:
after successfully authenticating a user in accordance with an authentication security level, permitting, by a computer processor, the user to access e-mail messages having a security level equal to or less than the authentication security level, each e-mail message including attributes assigned by the user and being stored in a memory, the user being the sender of the stored e-mail messages;

selecting at least one sent e-mail message; and changing at least one attribute included in the selected at least one e-mail message to include different attributes for each recipient of a sent e-mail message.

2. A method for increasing e-mail security in accordance with claim 1, said authenticating step comprising:

determining that the user was not successfully authenticated within a time period preceding said selecting step;

determining a security level required for viewing the at least one e-mail message;

determining an authentication data requirement corresponding to the security level; and capturing authentication data in accordance with the authentication data requirement from the user and successfully authenticating the user when the captured authentication data matches authentication data of the user stored in the memory.

3. A method for increasing e-mail security in accordance with claim 1, said selecting operation comprising selecting an e-mail message having a security level greater than the security level associated with successful authentication.

4. A method for increasing e-mail security in accordance with claim 3 further comprising:

determining an authentication data requirement corresponding to the greater security level; and capturing authentication data in accordance with the authentication data requirement from the user and successfully authenticating the user when the captured authentication data matches authentication data of the user stored in the memory.

5. A computer system for increasing e-mail message security comprising:

a computer processor; and a memory operable to store e-mail messages, each e-mail message including at least one control attribute assigned by a user, said computer system being associated with a network and said memory being coupled to said processor and having instructions stored thereon which, when executed by said processor, cause said processor to perform operations comprising:

permitting, after successfully biometrically authenticating the user in accordance with an authentication security level, the user to access stored e-mail messages having a security level equal to or less than the authentication security level, the user being the sender of the stored e-mail messages; and changing at least one attribute assigned to at least one sent e-mail message to include different attributes for each recipient of a sent e-mail message.

6. A computer system for increasing e-mail message security in accordance with claim 5, said processor being caused to perform operations further comprising:

determining a user requesting access to the at least one sent e-mail message was not successfully authenticated within a time period preceding the request;

determining a security level required for viewing the at least one sent e-mail message; and determining an authentication data requirement corresponding to the security level.

7. A computer system for increasing e-mail message security in accordance with claim 5, said processor being caused to perform operations further comprising determining a user requesting access to the at least one sent e-mail message was successfully authenticated within a time period preceding the request.

8. A method for increasing e-mail message security comprising:

after successfully biometrically authenticating a user in accordance with an authentication security level, permitting, by a computer processor, the user to access e-mail messages having a security level equal to or less than the authentication security level, each e-mail message including a draft message and attributes assigned by the user and being stored in a memory, the user being the sender of the stored e-mail messages; and changing at least one attribute assigned to at least one e-mail message after the e-mail message was sent to include different attributes for each recipient of a sent e-mail message.

9. A method for increasing e-mail message security in accordance with claim 8 further comprising:

determining that a user requesting access to the sent e-mail message was not successfully authenticated within a time period preceding the request;

determining a security level required for viewing the e-mail message; and determining an authentication data requirement corresponding to the security level.

10. A method for increasing e-mail message security in accordance with claim 9 further comprising determining a user requesting access to the sent e-mail message was successfully authenticated within a time period preceding the request.

* * * * *